US012621322B2

(12) United States Patent
Jayaraman et al.

(10) Patent No.: US 12,621,322 B2
(45) Date of Patent: May 5, 2026

(54) METHOD AND NETWORK NODE FOR DETECTING ANOMALOUS ACCESS BEHAVIOURS

(71) Applicant: Telefonaktiebolaget LM Ericsson (publ), Stockholm (SE)

(72) Inventors: Mahesh Babu Jayaraman, Bangalore (IN); Kavita Padmanabhan, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 18/269,982

(22) PCT Filed: Dec. 30, 2020

(86) PCT No.: PCT/IN2020/051071
§ 371 (c)(1),
(2) Date: Jun. 28, 2023

(87) PCT Pub. No.: WO2022/144908
PCT Pub. Date: Jul. 7, 2022

(65) Prior Publication Data
US 2024/0089279 A1      Mar. 14, 2024

(51) Int. Cl.
*G06F 21/00*          (2013.01)
*H04L 9/40*           (2022.01)
(52) U.S. Cl.
CPC ................................ *H04L 63/1425* (2013.01)
(58) Field of Classification Search
CPC . H04L 63/1425; G06F 21/552; H04W 12/121
See application file for complete search history.

(56) References Cited

U.S. PATENT DOCUMENTS 10,341,391 B1     7/2019   Pandey et al.
11,620,379 B1 *   4/2023   Hegde ................... G06F 21/554
                                              706/23

(Continued)

OTHER PUBLICATIONS

International Search Report and Written Opinion of the International Searching Authority, PCT/IN2020/051071, mailed Mar. 31, 2021, 9 pages.

(Continued)

*Primary Examiner* — Michael M Lee
(74) *Attorney, Agent, or Firm* — Sage Patent Group

(57) ABSTRACT

Embodiments of the present disclosure provide a method, a network node, and a computer program product for detecting anomalous access behaviours in a plurality of network nodes in a communication network. The method is performed in a network in the communication network. The method includes obtaining session logs associated with the plurality of network nodes in the communication network. The method includes extracting session features for each session by evaluating the session logs associated with the plurality of network nodes. Further, the method includes determining access behaviours associated with each session based on the extracted session features, the access behaviours associated with each session including a representation indicative of one or more of session characteristics, user access characteristics, network node access characteristics and command usage characteristics. The method further includes detecting (S14) anomalous access behaviours by analysing the determined access behaviours.

17 Claims, 20 Drawing Sheets

300

Start

Obtaining session logs associated with a plurality of network nodes (10a - 10n) in the communication network (100) ——S11

Extracting session features for each session by evaluating the session logs associated with the plurality of network nodes (10a – 10n) ——S12

Determining access behaviors associated with each session based on the extracted session features ——S13

Detecting anomalous access behaviors by analysing the determined access behaviors ——S14

Causing to display detected anomalous access behaviors ——S15

End

(56) References Cited

U.S. PATENT DOCUMENTS

| 2014/0181968 A1* | 6/2014 | Ge ..................... H04L 63/1416 |
| | | 726/23 |
| 2015/0310196 A1* | 10/2015 | Turgeman ............. H04W 12/06 |
| | | 726/19 |
| 2016/0337400 A1* | 11/2016 | Gupta ................. H04L 63/1416 |
| 2020/0021607 A1 | 1/2020 | Muddu et al. |
| 2021/0120026 A1* | 4/2021 | Kondaveeti ......... H04L 63/0272 |
| 2021/0152584 A1* | 5/2021 | Chakravarty ....... H04L 63/1425 |

OTHER PUBLICATIONS

Du, Sizhong et al., "Behavioral Anomaly Detection Approach Based on Log Monitoring," 2015 International Conference on Behavioral, Economic, and Socio-Cultural Computing (BESC 2015), Nanjing, China, 7 pages.
Extended European Search Report for European Patent Application No. 20967960.4 dated Jan. 22, 2024, 10 pages.

* cited by examiner

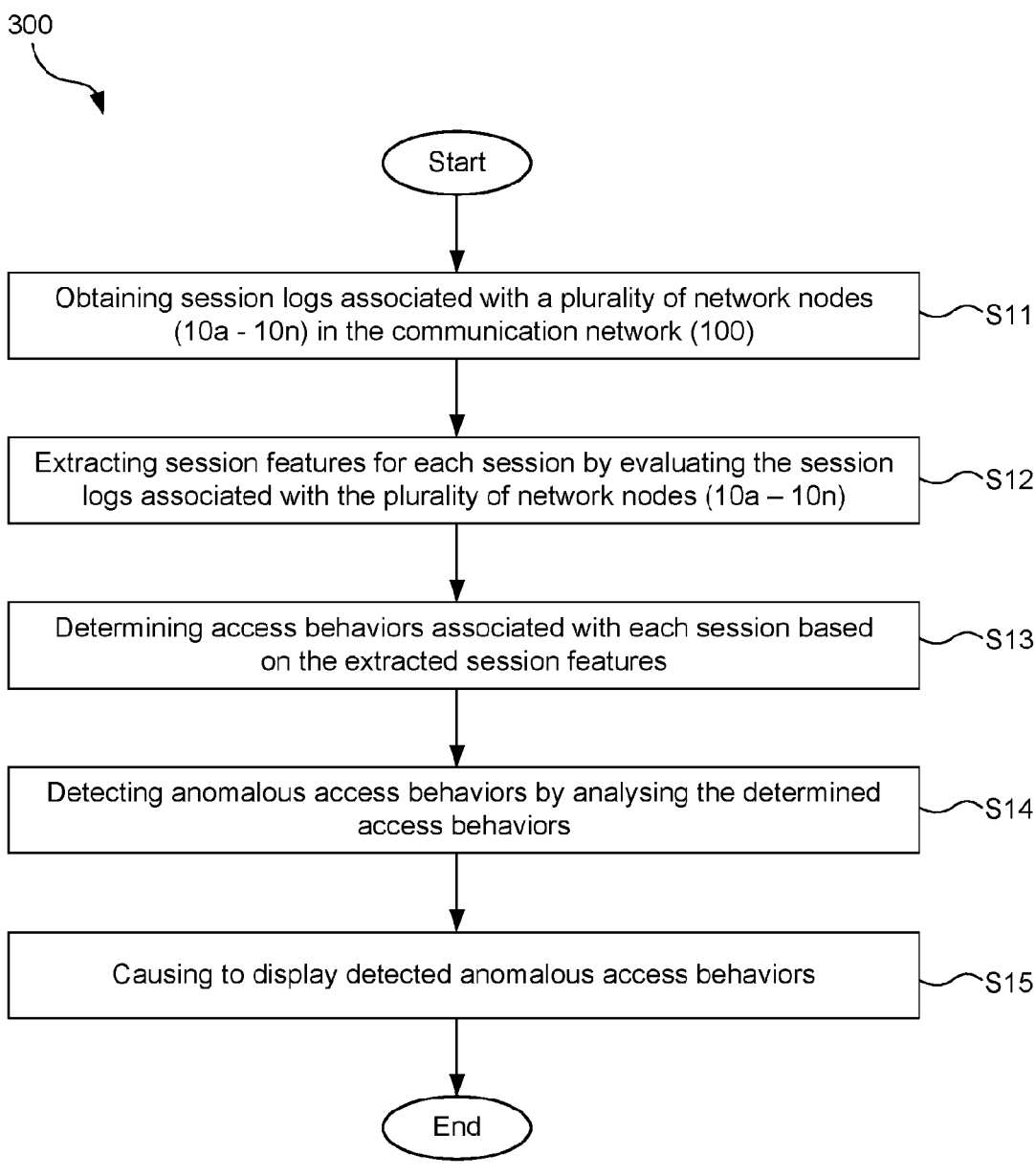

300

Start

Obtaining session logs associated with a plurality of network nodes (10a - 10n) in the communication network (100) —— S11

Extracting session features for each session by evaluating the session logs associated with the plurality of network nodes (10a – 10n) —— S12

Determining access behaviors associated with each session based on the extracted session features —— S13

Detecting anomalous access behaviors by analysing the determined access behaviors —— S14

Causing to display detected anomalous access behaviors —— S15

End

Extracting multiple line from each of the session log from the plurality of session logs     S32

Converting one or more special characters and spaces identified in each line of the session log to an equivalent vector of strings     S33

Determining the set of command lines in each of the session Logs using a model trained with the obtained input data sets (13a and 13b)     S35

900

| Obtaining extracted session for each user | S43 |

| Determining user access patterns from the extracted session features | S45 |

| Determining user session patterns from the extracted session features | S47 |

| Determining user access characteristics by combining the user patterns and the user session patterns | S49 |

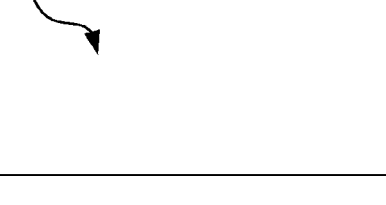
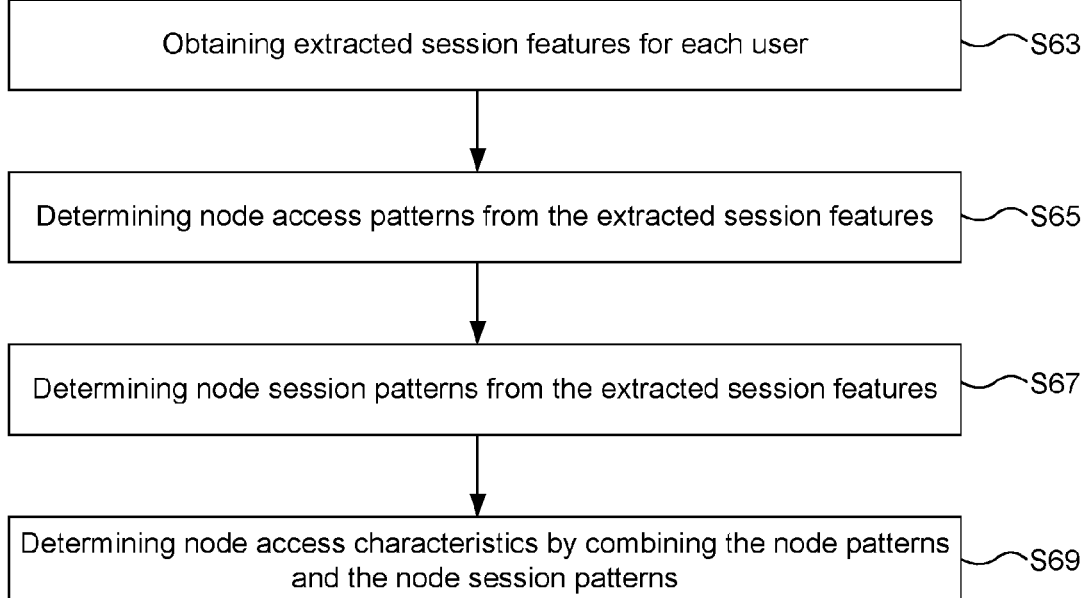
Obtaining extracted session features for each user — S63
Determining node access patterns from the extracted session features — S65
Determining node session patterns from the extracted session features — S67
Determining node access characteristics by combining the node patterns and the node session patterns — S69
FIG. 12

1400

Obtaining extracted session features for each user ⟞S83

Extracting one or more of a number of risky commands
And a number of safe commands executed from the plurality
of session features for each session ⟞S85

Determining the command usage pattern based on frequency such as
frequent commands or rare commands and a number of risky
commands executed ⟞S87

1500

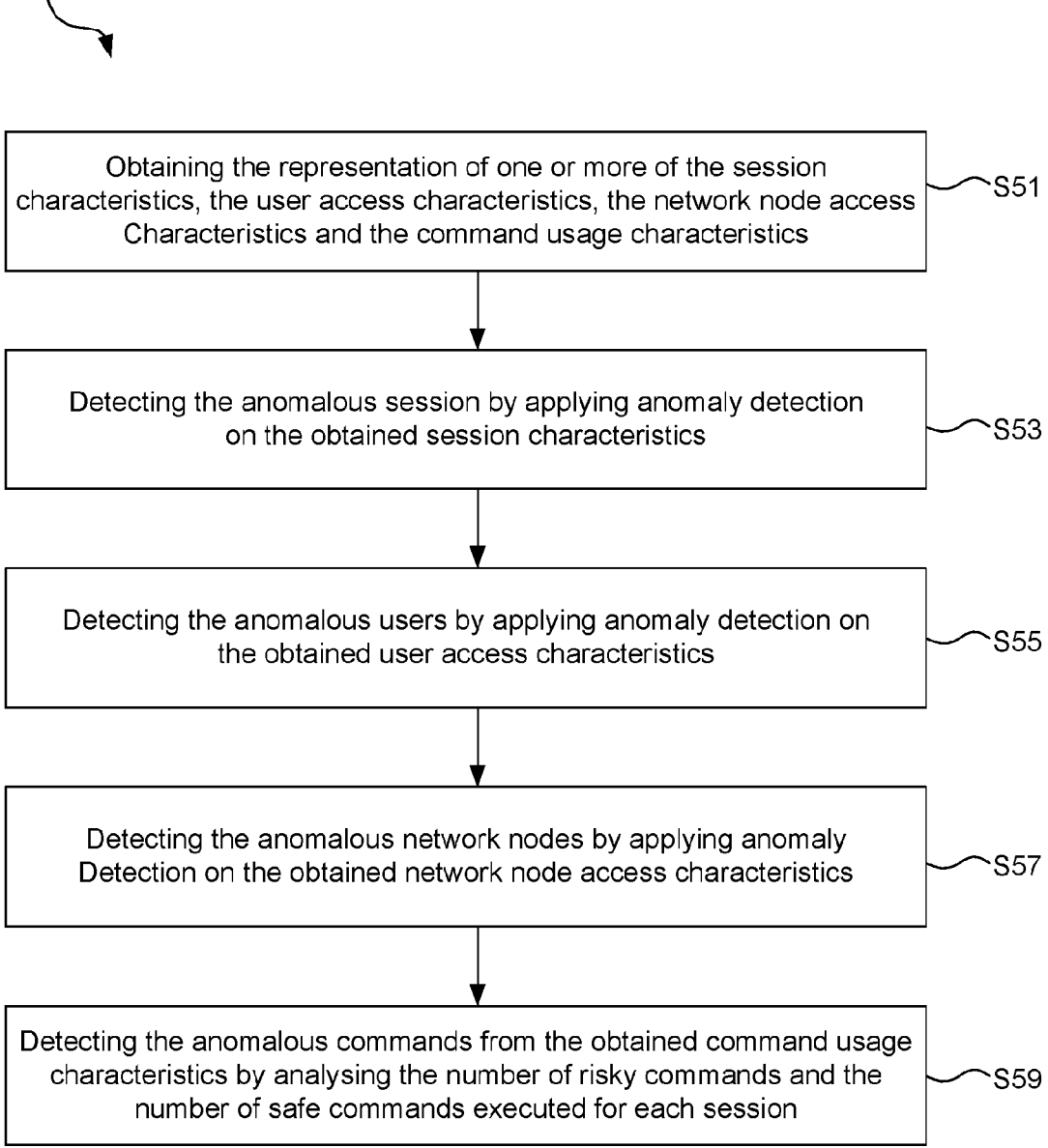

Obtaining the representation of one or more of the session characteristics, the user access characteristics, the network node access Characteristics and the command usage characteristics ⟋S51

Detecting the anomalous session by applying anomaly detection on the obtained session characteristics ⟋S53

Detecting the anomalous users by applying anomaly detection on the obtained user access characteristics ⟋S55

Detecting the anomalous network nodes by applying anomaly Detection on the obtained network node access characteristics ⟋S57

Detecting the anomalous commands from the obtained command usage characteristics by analysing the number of risky commands and the number of safe commands executed for each session ⟋S59

FIG. 15

METHOD AND NETWORK NODE FOR DETECTING ANOMALOUS ACCESS BEHAVIOURS

CROSS REFERENCE TO RELATED APPLICATIONS

This application is a 35 U.S.C. § 371 national stage application of PCT International Application No. PCT/IN2020/051071 filed on Dec. 30, 2020, the disclosure and content of which is incorporated by reference herein in its entirety.

TECHNICAL FIELD

The present disclosure relates to detection of anomalous access behaviours. More particularly, to method, network node and computer program products for detection of anomalous access behaviours in a plurality of network nodes of a communication network.

BACKGROUND

Different mechanisms have been developed to detect various network security threats. The security threats can originate from malicious activities of a human, such as a hacker or a malicious insider, and/or from activities of malicious code.

These malicious activities can cause harm to the network's software or hardware, or its users. Malicious activities may include unauthorized access or subsequent unpermitted use of network resources and data. Network administrators seek to detect such activities, for example, by searching for patterns of behaviour that are abnormal.

An existing mechanism of terminal session-based access-proxying enables controlled access to an infrastructure. Such access is typically required for remote administrators/users. The terminal access-proxy mechanism enables terminal (i.e., a network node) access to the users. Such infrastructure is typically used in managed services, network operations and during network management to carry out administrative and other similar tasks using terminal sessions, where the user enters the prompt in a terminal that provides access using various commands that can be executed as applicable. Such operations carried out and commands entered may vary and may be contextual depending on the infrastructure, applications and its types of use.

Some managed service operations include, for example, managing charging solutions in a number of customer networks where the administrators access charging solution nodes for remote administration purposes. For example, the charging solution may contains "screen" utility-based capture of terminal session logs. These terminal session logs are highly unstructured and such terminal session logs contain enormous and essential monitoring information for effective operations.

Existing systems that takes session logs or user behaviour data mostly consume structured or standardized information sets. The existing systems do not accept terminal session logs which are recorded on a per user login basis and the contents of the terminal session are syntactically and semantically different.

Conventional scanning of every such terminal session log for understanding abnormal, anomalous, suspicious, outlier or rare conditions and threat behaviours is a difficult task, and monitoring the terminal session logs is performed using rule-based systems i.e., by matching for patterns of known commands that are not desirable in each deployment. Each deployment may have its customized list which is checked for tagging behaviours as suspicious activities.

Further, the contents of terminal session logs may vary due to different deployments i.e., different applications running in nodes which contribute towards the heterogeneity in the session logs. Other factors include operating system, shell used, system configurations, commands that are specific to certain node. Due to such diverse nature, the terminal session logs may have diverse variations which makes it difficult to abstract out into a single set of patterns/rules, making it very difficult to comprehend the terminal session logs.

Consequently, there is a need for improvement in this field of technology and then especially a need for new mechanisms to improve the detection of anomalous access behaviours for enhancing the safety of network nodes.

SUMMARY

It is therefore an object of the present disclosure to provide a method, a computer program product, and a network node for detecting access behaviours that seeks to mitigate, alleviate, or eliminate all or at least some of the above-discussed drawbacks of presently known solutions.

This and other objects are achieved by means of a method, a computer program product, and a device as defined in the appended claims. The term exemplary is in the present context to be understood as serving as an instance, example or illustration.

According to a first aspect of the present disclosure, a method for detecting anomalous access behaviours in a plurality of network nodes in a communication network is provided.

The method is performed in at least one network node. The method comprises obtaining session logs associated with the plurality of network nodes in the communication network. The method comprises extracting session features for each session by evaluating the session logs associated with the plurality of network nodes. Further, the method comprises determining access behaviours associated with each session based on the extracted session features. The access behaviours associated with each session comprising a representation indicative of one or more of session characteristics, user access characteristics, network node access characteristics and command usage characteristics. The method further comprises detecting anomalous access behaviours by analysing the determined access behaviours.

In some embodiments, the step of extracting the session features for each session by evaluating the session logs associated with the plurality of network nodes comprises obtaining input data sets, each data set comprising one or more of a set of command lines, a set of non-command lines, and a set of pre-defined commands indicative of a command type, a command category, safe commands and risky commands. Further, the method comprises evaluating a set of command lines in each of the session log using the obtained input data sets and the set of predefined commands.

In some embodiments, the step of evaluating the set of command lines in each of the session log based on the obtained input data sets and the set of predefined commands comprises determining a set of command lines in each of the session log based on the obtained input data sets comprising the set of command lines, the set of non-command lines and the set of pre-defined commands. Further, the method comprises extracting features associated with the determined set of command lines in each of the session log.

In some embodiments, the step of determining the set of command lines in each of the session log comprises extracting multiple lines from each of the session log from the plurality of session logs. The method comprises converting one or more special characters and spaces identified in each line of the session log to an equivalent vector of strings. Further, the method comprises determining the set of command lines in each of the session log using a model trained with the obtained input data sets.

In some embodiments, the step of determining the access behaviours comprising the representation of the session characteristics associated with each session comprises obtaining the extracted session features for each session and identifying textual features in a set of command lines from the session features for each session. Further, the method comprises translating the identified textual features in the set of command lines to an equivalent vector using a vectorizer. Furthermore, the method comprises creating a numerical representation for the set of command lines for each session, wherein the numerical representation is created by applying a feature vector for each command line in the set of command lines and the translated textual features.

In some embodiments, the step of determining the access behaviours comprising the representation of the user access characteristics associated with each session based on the extracted plurality of session features comprises obtaining the extracted session features for each user and determining user access patterns for each session of the user from the extracted session features based on one or more of a number of sessions for each user, a number of network nodes accessed for each user, a number of risky commands executed by each user, and a duration of the sessions for each user. Further, the method comprises determining user session patterns for each session of the user from the extracted session features based on one or more of command lines for each session and command category for each session. Furthermore, the method comprises determining the user access characteristics by combining the determined user access patterns and determined user session patterns.

In some embodiments, the step of determining the access behaviours comprising the representation of the network node access characteristics associated with each session based on the extracted plurality of session features comprises obtaining the extracted session features for each node, determining node access patterns for each session of the node from the session features based on one or more of a number of sessions for each node, a number of users accessed for each node, a number of risky commands executed for each node, and a duration of the sessions for each node. The method further comprises determining node session patterns for each session of the node from the session features based on one or more of command lines for each session and command category for each session. Further, the method comprises determining the node access characteristics by combining the determined node access patterns and determined node session patterns.

In some embodiments, the step of determining the access behaviours comprising the representation of the command usage characteristics associated with each session based on the extracted plurality of session features comprises obtaining the extracted session features for each session. The method comprises extracting one or more of a number of risky commands and a number of safe commands executed from the plurality of session features for each session. The method further comprises determining the command usage pattern based on the extracted one or more of the number of risky commands and the number of safe commands executed for each session.

In some embodiments, the step of detecting anomalous access behaviours by analysing the determined access behaviours comprises obtaining the representation of one or more of the session characteristics, the user access characteristics, the network node access characteristics and the command usage characteristics. The method comprises detecting the anomalous sessions by applying anomaly detection on the obtained session characteristics. Further, the method comprises detecting the anomalous users by applying anomaly detection on the obtained user access characteristics. The method further comprises detecting the anomalous network nodes by applying anomaly detection on the obtained network node access characteristics. The method comprises detecting the anomalous commands from the obtained command usage characteristics by analysing the number of risky commands and the number of safe commands executed for each session.

In some embodiments, the method further comprises causing to display the detected anomalous access behaviours being indicative of one or more of anomalous sessions, anomalous users, anomalous network nodes and anomalous commands.

According to a second aspect of the present disclosure, a network node for detecting anomalous access behaviours in a plurality of network nodes in a communication network. The network node comprising a processing circuitry, and a memory storing instructions when executed by the processing circuitry cause the network node to: obtain session logs associated with the plurality of network nodes in the communication network; determine access behaviours associated with each session based on the extracted plurality of session features, wherein the access behaviours associated with each session comprises a representation indicative of one or more of session characteristics, user access characteristics, network node access characteristics and command usage characteristics; detect anomalous access behaviours by analysing the determined access behaviours.

According to a third aspect of the present disclosure, there is provided a computer program product comprising a non-transitory computer readable medium, having thereon a computer program comprising program instructions. The computer program is loadable into a data processing unit and configured to cause execution of the method according to the first aspect when the computer program is run by the data processing unit.

An advantage of some embodiments is that alternative and/or improved approaches for detection of anomalous access behaviours in the plurality of network nodes in the communication network are provided.

An advantage of some embodiments is that the proposed method allows monitoring of shortlisted sessions for audit/inspection to detect outlier/anomaly/rareness/suspicious factors. The proposed method can be used to significantly reduce manual effort and to increase audit efficiency by producing shortlisted session features and/or insights of interest. Such insights are outliers/anomalies or rare conditions in the terminal session logs is difficult to retrieve through a manual process. These insights represent user sessions/behaviors that are different from a typical behavior.

Further, the proposed method can be used to reduce or avoid the need for full scan of all the volumes of session logs which is very huge laborious and manual effort. The proposed method can be used to perform performance analysis or identify improvement areas based on the detected outliers in operations.

Additionally, the proposed method can be used to identify abnormal or outliers using machine learning techniques in the terminal session logs with less supervision, thereby eliminating the need for heavy manual work in configuring rule based matching systems.

In some embodiments, the proposed method can be used to identify if a line in session is command line or not a command line.

In some embodiments, the proposed method can be used to create embeddings of the command lines and sessions to create a representation that enables application of ML methods to detect anomalies or outliers.

The proposed method allows detection of anomalies or outliers at session level i.e., number of anomalous sessions, user level i.e., number of anomalous users, node level i.e., number of anomalous nodes and command level i.e., number of anomalous commands.

In some embodiments, the proposed method allows storage of different inputs such as safe commands, risky commands and command category with locally created datasets and as well as customizable data sets which enables enhanced feature engineering to characterize a terminal session. The locally created data set enables automatic classification of command line or not a command line, which enables contextualization of the results and provides more meaningful features to operators/administrators for converting detection to an actionable insight.

Advantageously, the proposed method can be readily implemented in a network node or a remoted computer located in a cloud environment or a remote server in a cloud network. Further, the proposed method can be implemented using software-as-a-service model in case of managed services.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3 is a flowchart illustrating example method steps for detecting anomalous access behaviours;

FIG. 12 is a flow chart illustrating various example method steps for aggregation of node access characteristics;

FIG. 15 is a flowchart illustrating example method steps for detecting anomalous access behaviours based on the determined access behaviours;

DETAILED DESCRIPTION

Figure 1A:
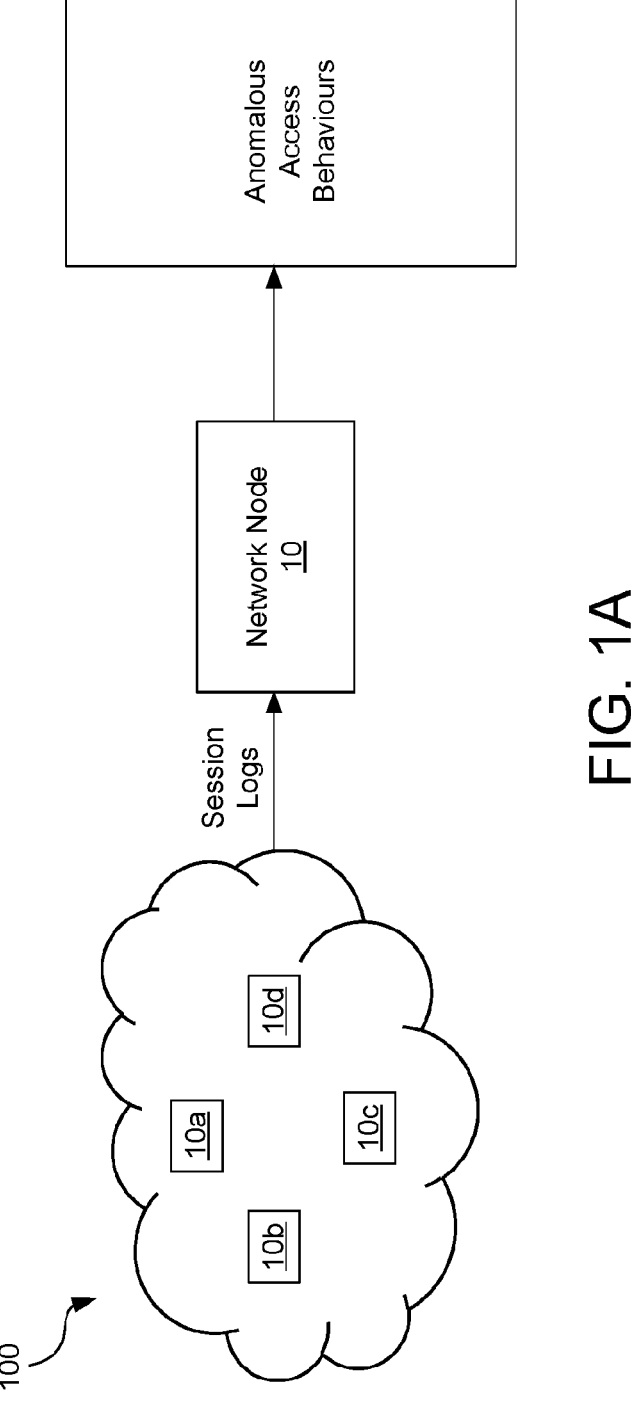
FIGS. 1A and 1B disclose an example environment for detecting anomalous access behaviours.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1B:
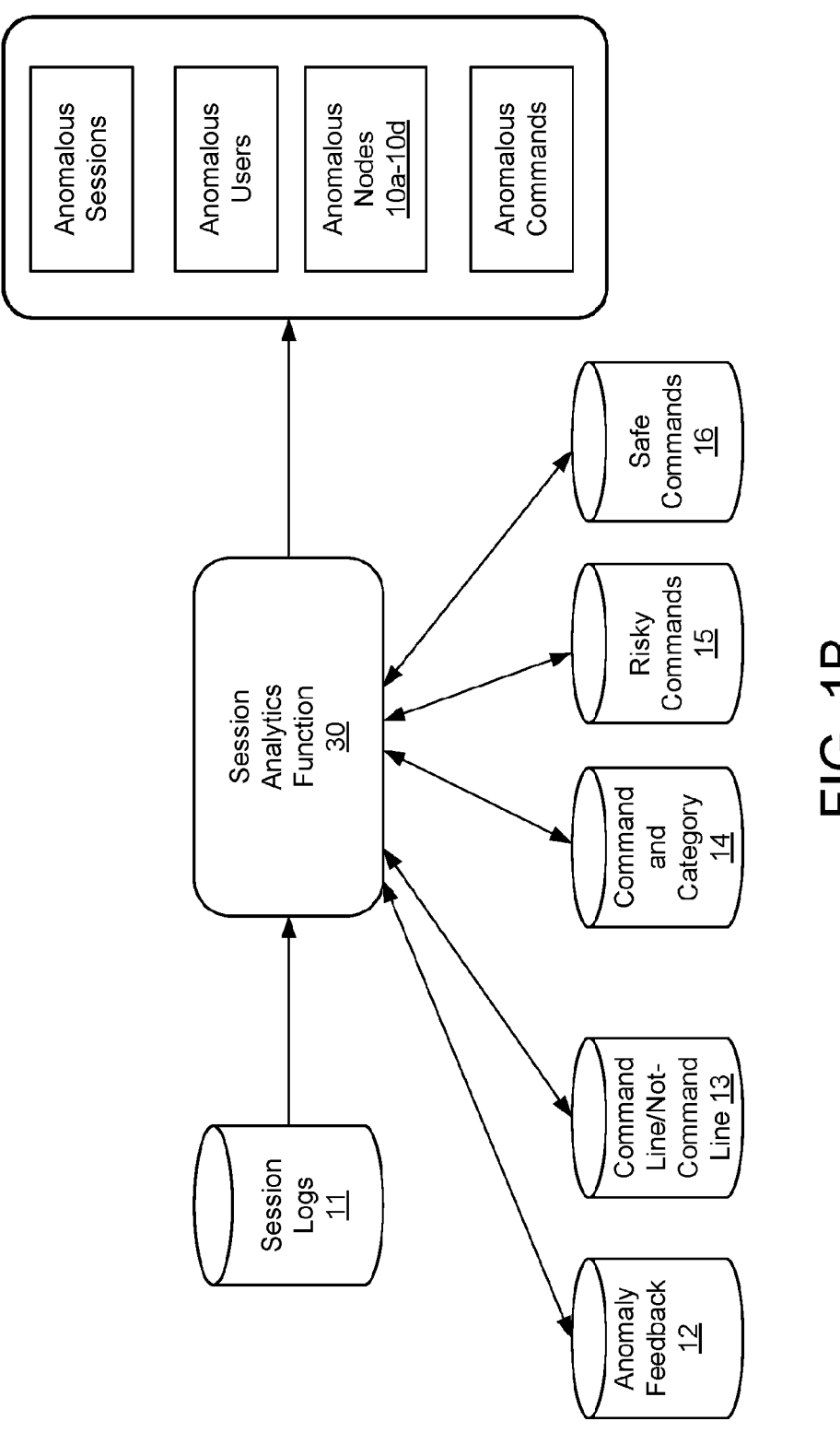
Figure 16:
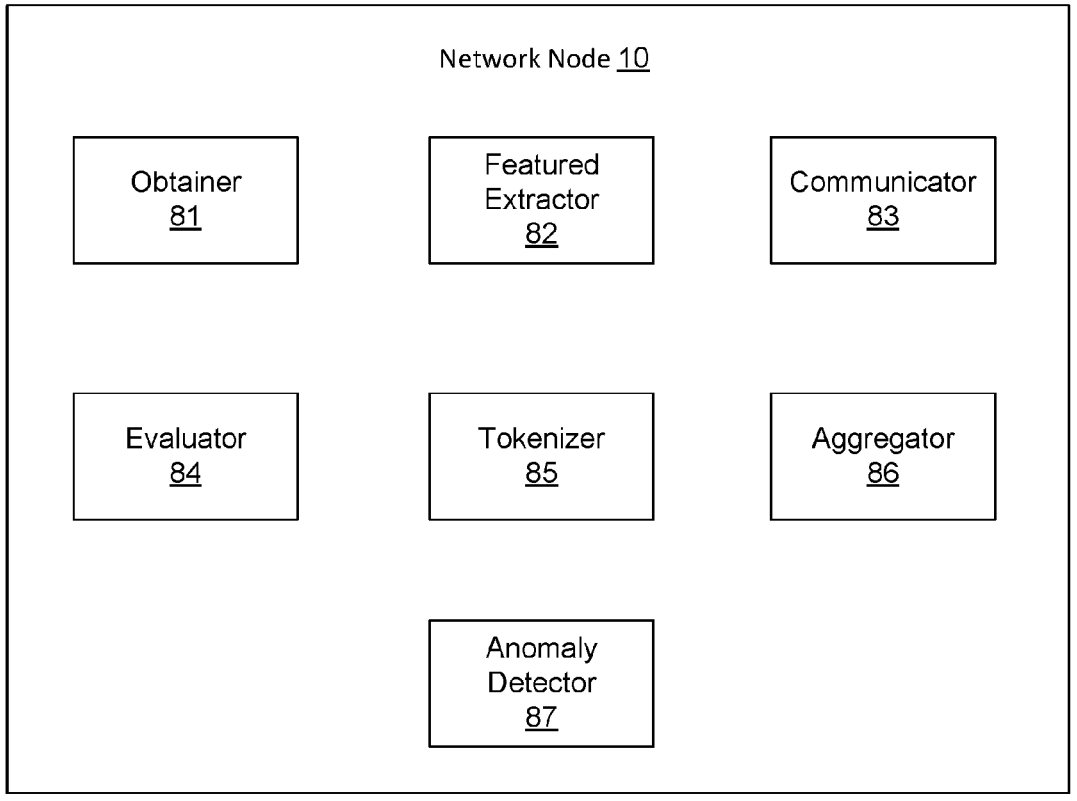
FIG. 16 is an example schematic diagram showing functional modules of the network node of FIG. 1A.

FIGS. 1A and 16 disclose an example environment for detecting anomalous access behaviours. The example environment includes a communication network 100 representing a networked computing environment comprising network nodes 10a-10d and the one or more network nodes 10a-10d in the communication network 100 may be communicatively coupled to each other through a suitable communication means, which can include the Internet and one or more wired or wireless networks (e.g., an Internet Protocol (IP)-based local area network, LAN, metropolitan area network, MAN, wide area network, WAN, a Wireless LAN, WLAN, network such as Wireless Fidelity, Wi-Fi, and/or a cellular telecommunications network such as Global System for Mobile Communications, GSM, network, 3G network, or long term evolution, LTE, network). The network nodes 10, 10a-10d can be, for example, a personal computer, a server, a notebook computer, or any other form of computing system or device that allows a user to access the information within the communication network 100. While only the network nodes 10a-10d is shown in FIG. 1A, any number of network nodes 10a-10n (not shown) may be present in the communication network 100. Although, there may exist any number of network nodes 10a-10n (not shown in FIG. 1), various embodiments of the present disclosure, are explained with only the network node 10 which implements the various steps for detecting anomalous access behaviours in the plurality of network nodes 10a-10n in the communication network 100.

Further, the network node 10, can be for example, a remote computer or a server hosted in the communication network 100 or in a cloud network. The network node 10 obtains session logs associated with the network nodes 10a-10d. The network node 10 evaluates the obtained session logs from the network nodes 10a-10d for extracting various session features for each session. The network node 10 may determine access behaviours associated with each session based on the extracted session features. For example, the access behaviours associated with each session includes a representation which is indicative of one or more of session characteristics, user access characteristics, network node access characteristics and command usage characteristics. Further, the network node 10 determines anomalous access behaviours by analysing the determined access behaviours. The determined anomalous access behaviours may be presented to a user or a network administrator as include a graphical user interface, GUI that can create visualizations of the detected anomalies in the plurality of network nodes 10a-10d.

The network node 10 may implement a security platform for detecting anomalous access behaviours in the plurality of network nodes 10a-10d. For example, the security platform includes a session analytics function 30 that implements one or more steps for detecting the anomalous access behaviours in the plurality of network nodes 10a-10d as shown in FIG. 18. The session analytics function 30 employs a variety of techniques and mechanisms to detect anomalies and threats in the communication network 100. The session analytics function 30 is "big data" driven and employs machine learning to perform security analytics and the session analytics function 30 performs user/entity behavioural analytics to detect security related anomalies and threats.

The session analytics function 30 employing machine learning, obtains various inputs including but not limited to session logs 11, anomaly feedback 12, an Artificial Intelligence, AI model that classifies a command line or Not-command line 13, command categories 14, risky commands 15 and safe commands 16. Further, the session analytics function 30, based on the obtained input, determines the anomalous access behaviours which are indicative of anomalous sessions, anomalous users, anomalous nodes and anomalous commands.

Figure 2:
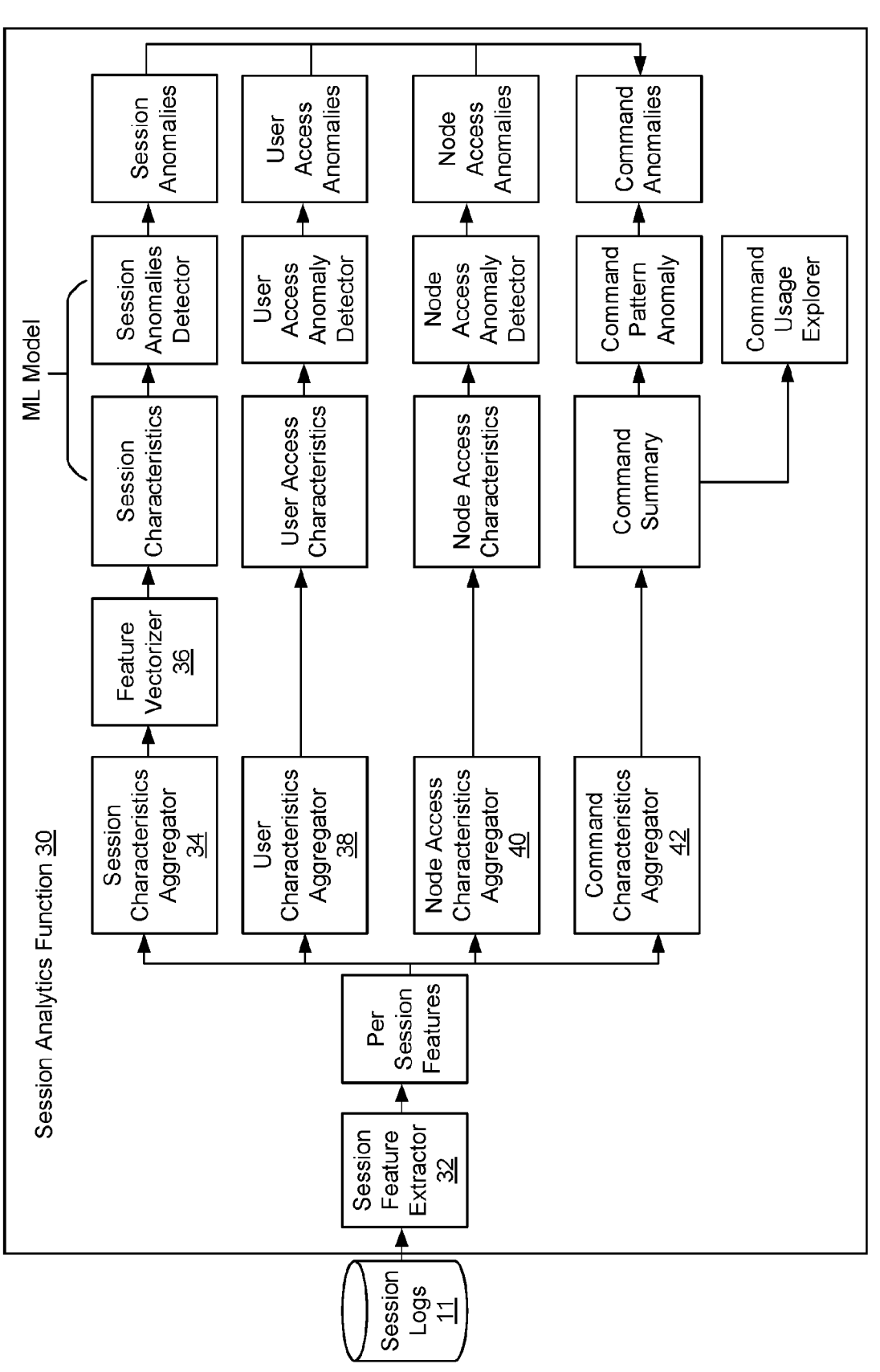
FIG. 2 is an example schematic diagram showing functional modules of a network node for detecting anomalous access behaviours.

FIG. 2 is an example schematic diagram showing functional modules of the network node 10 for detecting anomalous access behaviours. As described above, the network node 10 implements a security platform that includes a session analytics function 30 which implements one or more steps for detecting anomalous access behaviours in the plurality of network nodes 10a-10d. The session analytics function 30 obtains the input as session logs 11. The session analytics function 30 includes various functional modules such as session characteristics aggregator 34, feature vectorizer 36, user access characteristics aggregator 38, node access characteristics aggregator 40 and command characteristics aggregator 42. Further, the session analytics function 30 employs machine learning, ML based models on the obtained session characteristics, user access characteristics, node access characteristics and command characteristics for detection of anomalous sessions, anomalous users, anomalous nodes and anomalous commands respectively. The operation of the various functional modules of the session analytics function 30 will be discussed in greater detail in the later parts of the description.

FIG. 3 is a flowchart illustrating an example method 300 for detecting anomalous access behaviours. As stated above, the network node 10 implements method 300 for detecting anomalous access behaviours in the plurality of network nodes in the communication network. At step S11, the method 300 comprises obtaining the session logs associated with the plurality of network nodes in the communication network. For example, the network node 10 obtains the session logs 11 associated with the plurality of network nodes 10a-10n for a pre-configured historic period. The session logs 11 obtained from the plurality of network nodes 10a-10n include unstructured data, patterns, various types of characters including control, escape, color, sound characters, command lines and non-command lines or the like.

At step S12, the method 300 comprises extracting session features for each session by evaluating the session logs associated with the plurality of network nodes 10a-10n. Each session is composed of many characteristic information. Some of the session features are available from the session information like user who is accessing, node which is accessed, start time, end time. There exist many features for each session which are extracted by evaluating the session logs.

In an embodiment, the session features are extracted by obtaining input data sets, where each data set comprising one or more of a set of command lines, a set of non-command lines, and a set of pre-defined commands indicative of a command type, a command category, safe commands and risky commands and evaluating a set of command lines in each of the session log using the obtained input data sets and the set of predefined commands.

In an embodiment, the evaluation of the set of command lines comprises determining a set of command lines in each of the session log based on the obtained input data sets comprising the set of command lines, the set of non-command lines and the set of pre-defined commands and extracting features associated with the determined set of command lines in each of the session log. For example, the set of command lines in each of the session log may be determined by extracting multiple lines from each of the session log from the plurality of session logs, converting one or more special characters and spaces identified in each line of the session log to an equivalent vector of strings and determining the set of command lines in each of the session log using a model trained with the obtained input data sets.

At step S13, the method 300 comprises determining access behaviours associated with each session based on the extracted session features. For example, the determined access behaviours includes a representation which is indicative of one or more of session characteristics, user access characteristics, node access characteristics and command usage characteristics. The access behaviours associated with each session are determined for obtaining the session characteristics and the obtained session characteristics are aggregated to determine aggregated session characteristics. The access behaviours associated with each user are determined for obtaining the user access characteristics and the obtained user characteristics are aggregated to determine aggregated user characteristics. The access behaviours associated with each node are determined for obtaining the node access characteristics and the obtained node characteristics are aggregated to determine aggregated node characteristics. Further, the access behaviours comprising the representation of the command usage characteristics associated with each session are determined for obtaining the command usage characteristics.

At step S14, the method 300 comprises detecting anomalous access behaviours by analysing the determined access behaviours. In order to detect the anomalous access behaviours from the determined access behaviours, the representation of the session characteristics, the user access characteristics, the network node access characteristics and the command usage characteristics are obtained. The representation of the session characteristics, the user access characteristics, the network node access characteristics and the command usage characteristics are analysed using ML models to determine anomalous sessions, anomalous users, anomalous node and anomalous commands. For example, the anomalous sessions may be detected by applying anomaly detection on the obtained session characteristics. The anomalous users may be detected by applying anomaly detection on the obtained user access characteristics. The anomalous nodes may be detected by applying anomaly detection on the obtained network node access characteristics. Further, the anomalous commands may be detected from the obtained command usage characteristics by analysing the number of risky commands and the number of safe commands executed for each session and parameters such as frequency with which the command(s) are used like frequent or rare commands.

At step S15, the method 300 comprises causing to display the detected anomalous access behaviours. The detected anomalous access behaviours may be presented to the user or the network administrator using a GUI that can create visualizations of the detected anomalies.

Figure 4:
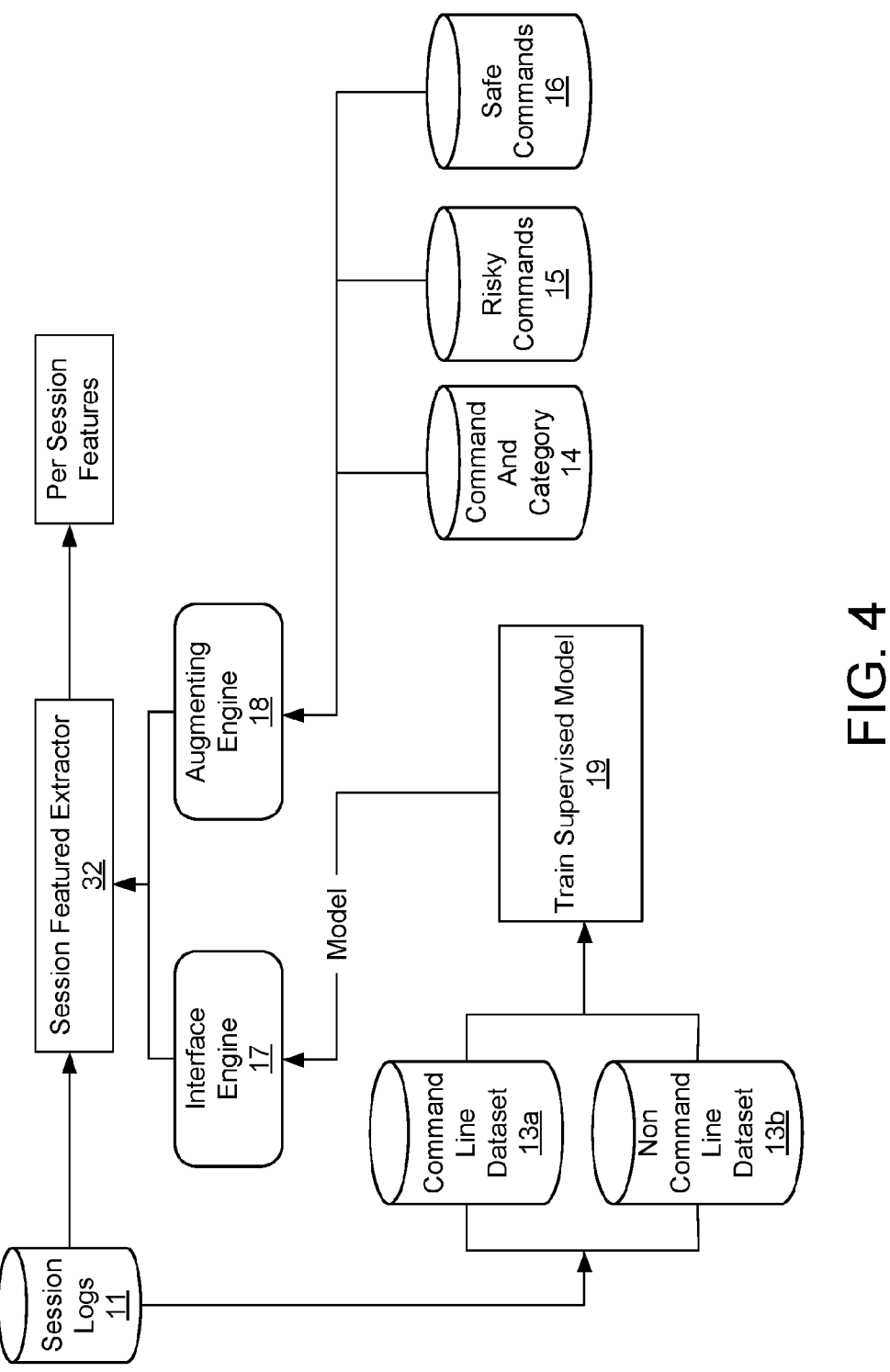
FIG. 4 is an example schematic diagram showing functional modules involved in session feature extraction for each session.

FIG. 4 is an example schematic diagram showing functional modules involved in session feature extraction for each session. A session feature extractor 32 may be configured to extract session features for each session by evaluating the session logs 11 associated with the plurality of network nodes 10a-10n. For example, the session feature extractor 32 may be configured to extract various features of a session including number of lines, for example, all lines in a session, command line features over the lines which are inferred as command lines, for example, number of command lines, strings or readable command lines representation properties from session data viz., session user, session start time, session end time, node id (IP), or the like.

For example, the session feature extractor 32 may be configured to receive the session logs 11, and an input from an inferencing engine 17 configured for inferencing a command line or not for each of the lines in the terminal session log through a trained AI model using a command line data set 13a and a non-command line data set 13b. Further, the session feature extractor 32 may be configured to obtain an input from an augmenting engine 18 which evaluates a set of command lines to determine the nature or types of command category involved in the session, number of risky commands, and number of safe commands etc., as session features. For example, the augmenting engine 18 may be configured to perform augmentation for a "Command category" which includes determining a command as file management command or a user administration/management, network configuration, hardware configuration, application specific command etc. These categories emanate real nature of commands which are used in the session. Such augmented features are extracted for pre-determined (such as preferences) inputs like risky-commands and safe-commands enabling better context for feature representation.

In some embodiments, the inferencing engine 17 may be configured for inferencing a command line or not a command line in the terminal session logs may be through an AI classification model for enhanced inferencing of the command lines in the terminal session logs.

In general, the command lines are usually free form text structures. Thus, it is easy to recognize a command line than that of non-command line by a human or a network operator. Therefore, the inferencing of the command lines may be formulated as an AI classification model to enable automated detection of command lines by the inferencing engine 17. Conventionally, regular expression-based solutions may be used, however given a dataset of terminal session logs, manual inspection over the terminal session logs fails due to unbounded set of patterns required to be coded. The variations and its possibilities make them hard to build a complete processor. Complex inclusion/exclusion structures were used to overcome the above problem, which makes the system very complex, unmaintainable and remains incomplete, while it is still easily understood by humans. Thus, the inferencing engine 17 introduces an AI/neural network-based component to classify a line to determine whether the line is command line or not a command line. The usage of AI based model reduces the dependence with regular expressions due to above described limitations.

In an example, a large dataset which includes a set of command lines 13a and a set of non-command lines 13b is created which helps identify command line against not-command lines and with the data set having the set of command lines 13a and the set of non-command lines 13b, the inferencing engine 17 is created, in which the inferencing model acts like a human and can recognize to obtain command lines during session feature extraction. The inferencing engine 17 may implement a terminal session line tokenizer and a command line classifier.

In order to classify a command line in the terminal session logs, the inferencing engine 17 that implements a terminal session line tokenizer which may be configured to perform some of the steps as described herein.

For example, a single line in terminal session log is characterized by an embedding layer that addresses the tokens in a command line unlike a typical NLP language processing which ignores many of the special characters viz., @, /, :, #, $, > and <etc. As these characters contribute in arriving at a conclusion if a line is command line or not, the inferencing engine 17 may be configured to adapt a tokenizing scheme.

Step 1: for each log in 'list of terminal session logs'
    Step 2: for each line in 'log'
    Step 3: Replace special characters to its alternative allegory as below
        @→"SYM_ATTHERATE"
        $→"SYM_DOLLAR"
        :→"SYM_COLON"
        -→"SYM_HYPEN"
        and so on . . .

so that these special characters are also is having a feature embedding.

Step 4: Tokenize a command line based on space and convert it to vector of strings Step next: Use this pre-processed data feed into the inferencing engine 17 for classification of command lines.

It should be noted that the dataset 13a and 13b goes through Step 3 and 4 as the context of session is not required for training phase of the inferencing engine 17 for command line classification.

The supervised model 19 which is neural network is trained through the datasets 13a and 13b to enable automatic inferencing by the inferencing engine 17.

In an example, the supervised model 19 learns the characteristics of a command line which include the following characteristics:

a) Command lines are typically syntactic in nature and there are many syntax variants depending on the operating systems and shell interface etc., b) Command prompt signature, the signature being varying but such a structure is present in the beginning of a line.

c) Command may be followed by number of argument values.

d) The command may be very long or too short or could be as explosive a "shell" in a machine can support.

e) There can be lot of white-spaces, comment lines looking like command lines, peculiar operation performed by the user resulting in dump of commands but not command line and so on variants.

The supervised model 19 learns latent characteristics from the datasets 13a and 13b for inferencing by the inferencing engine 17. These characteristics indicate that the network infrastructure should include handling prior knowledge about the sequence of words/symbols/tokens/prompt signatures/command/parameters involved and so on. The supervised model 19 uses recurrent neural network architecture with embedding layers which can used for classifying if a line is command line or not a command line from the terminal session logs.

In some examples, the supervised model 19 determines a probabilistic score indicating the accuracy with the supervised model 19 can predict whether a given line is a command line or not a command line based on previous patterns learnt by the supervised model 19. For commands, which have not been classified correctly, there can be a feedback loop to the machine learning model based on inputs provided manually, based on which the supervised model 19 is retrained for classifying if a line is command line or not a command line.

Thus, the session feature extractor 32 may be configured to extract per session features based on the obtained session logs and the input obtained from the inferencing engine 17 and the augmenting engine 18.

Figure 5A:
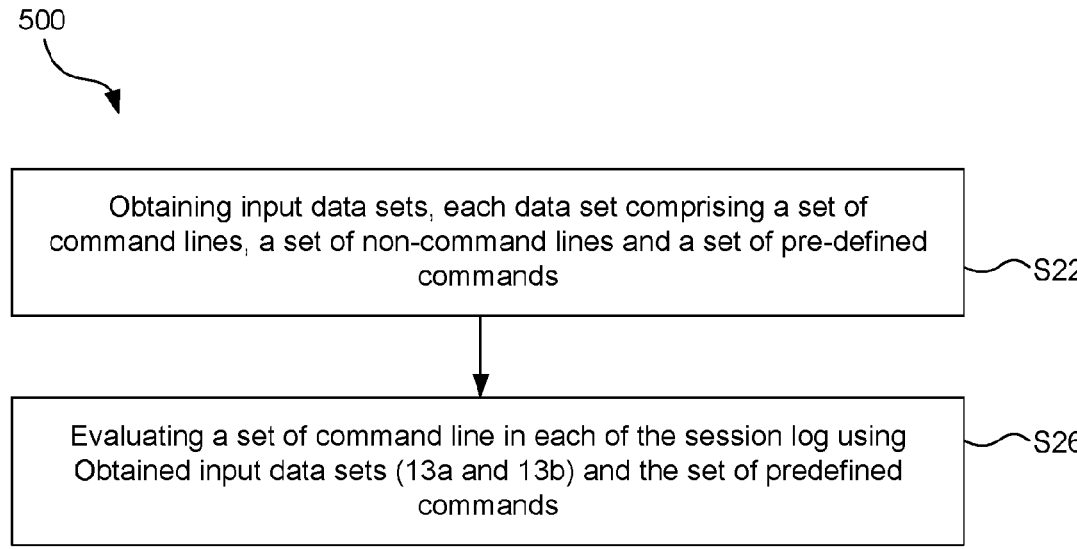
FIGS. 5A-5C are flowcharts illustrating example method steps for extracting session features for each session.
Figure 5B:
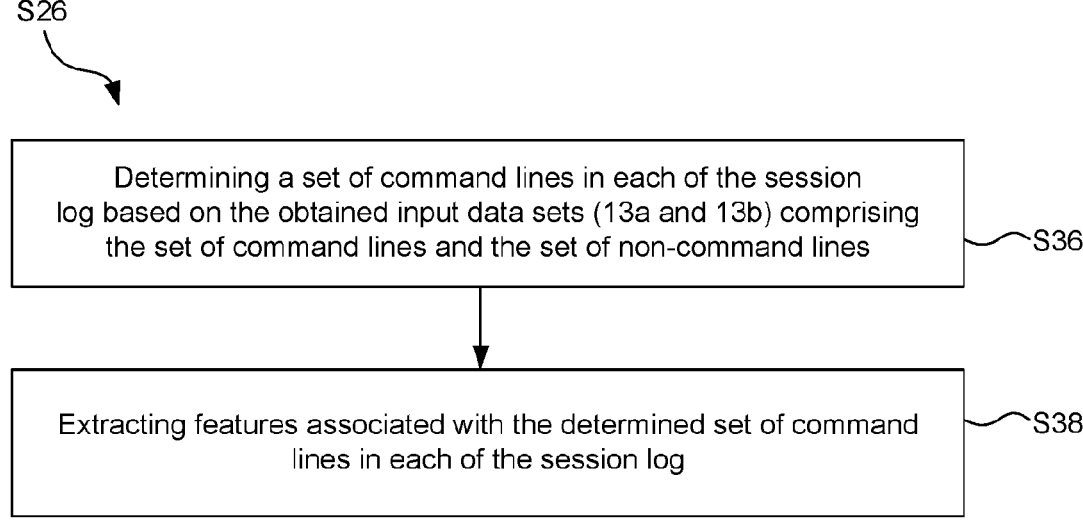
Figure 5C:
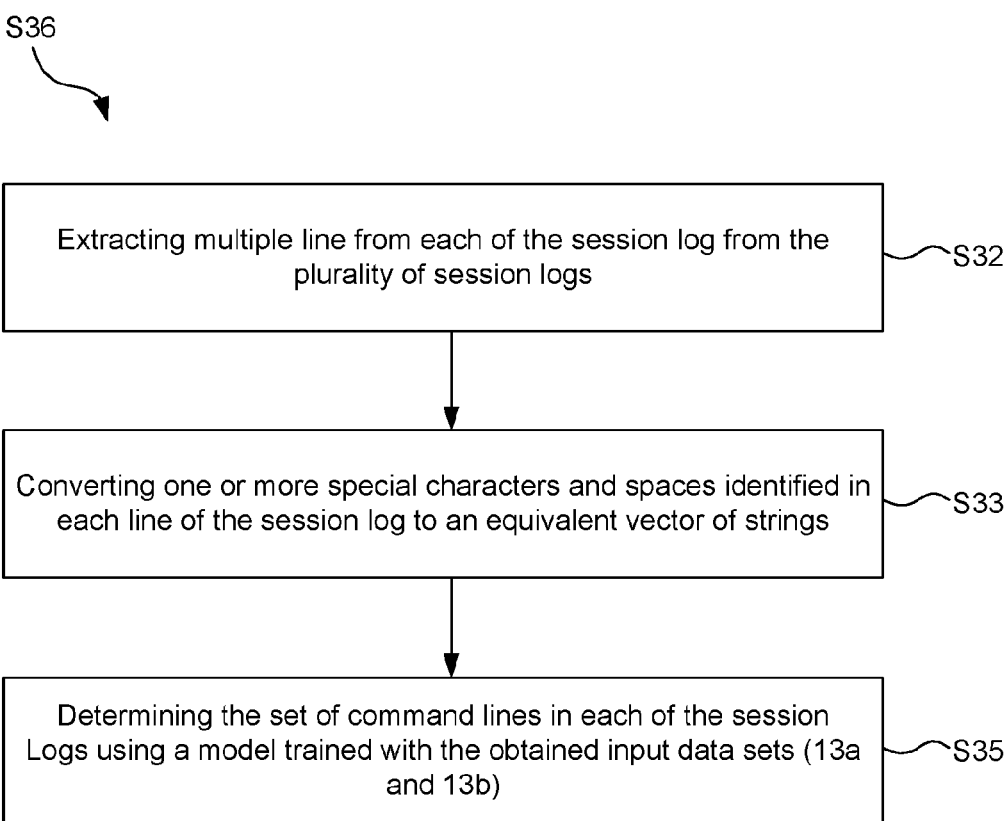

FIGS. 5A-5C are flowcharts illustrating example method 500 for extracting session features for each session. The step S12 as described in FIG. 3, for extracting session features for each session by evaluating the session logs associated with the plurality of network nodes 10a-10n comprises various example steps as described in method 500. Initially, at step S22, the method 500 includes obtaining input data sets, where each data set includes a set of command lines, a set of non-command lines and a set of pre-defined commands.

In an example, the command line data set 13a, the non-command line data set 13b and the set of pre-defined commands which include command and category 14, risky commands 15 and safe commands 16 are obtained as input data sets for session feature extraction for each session.

At step 26, the method 500 includes evaluating a set of command lines in each of the session log using the obtained data sets 13a and 13b and the set of pre-defined commands 14-16. The set of command lines in each of the session log are evaluated based on the obtained input data sets 13a, 13b and the set of pre-defined commands 14-16, to extract various session features for each session.

The step S26 as described in FIG. 5A, for evaluating a set of command lines in each of the session log using the obtained data sets 13a and 13b and the set of pre-defined commands 14-16 comprises various steps as described in FIG. 5B.

In an example, at step S36, the set of command lines in each of the session are determined based on the obtained data sets 13a and 13b and the set of pre-defined commands 14-16. Further, at step S38, the session features associated with the determined set of commands lines in each of the session log are extracted, as shown in FIG. 5b.

In an example, determination of set of command lines in each of the session based on the obtained data sets 13a and the set of pre-defined commands 13b comprises extracting multiple lines from each of the session log from the plurality of session logs, at step S32. Further, one or more special characters and spaces identified in each line of the session log are converted to an equivalent vector of strings at step S33. The set of command lines in each of the session log are determined using, for example, AI trained model with the obtained input data sets 13a and 13b, at step S35, as shown in FIG. 5C. It should be noted that the session feature extraction performed using the steps S32-S35 include the features extracted for each session or per session features.

Figure 6A:
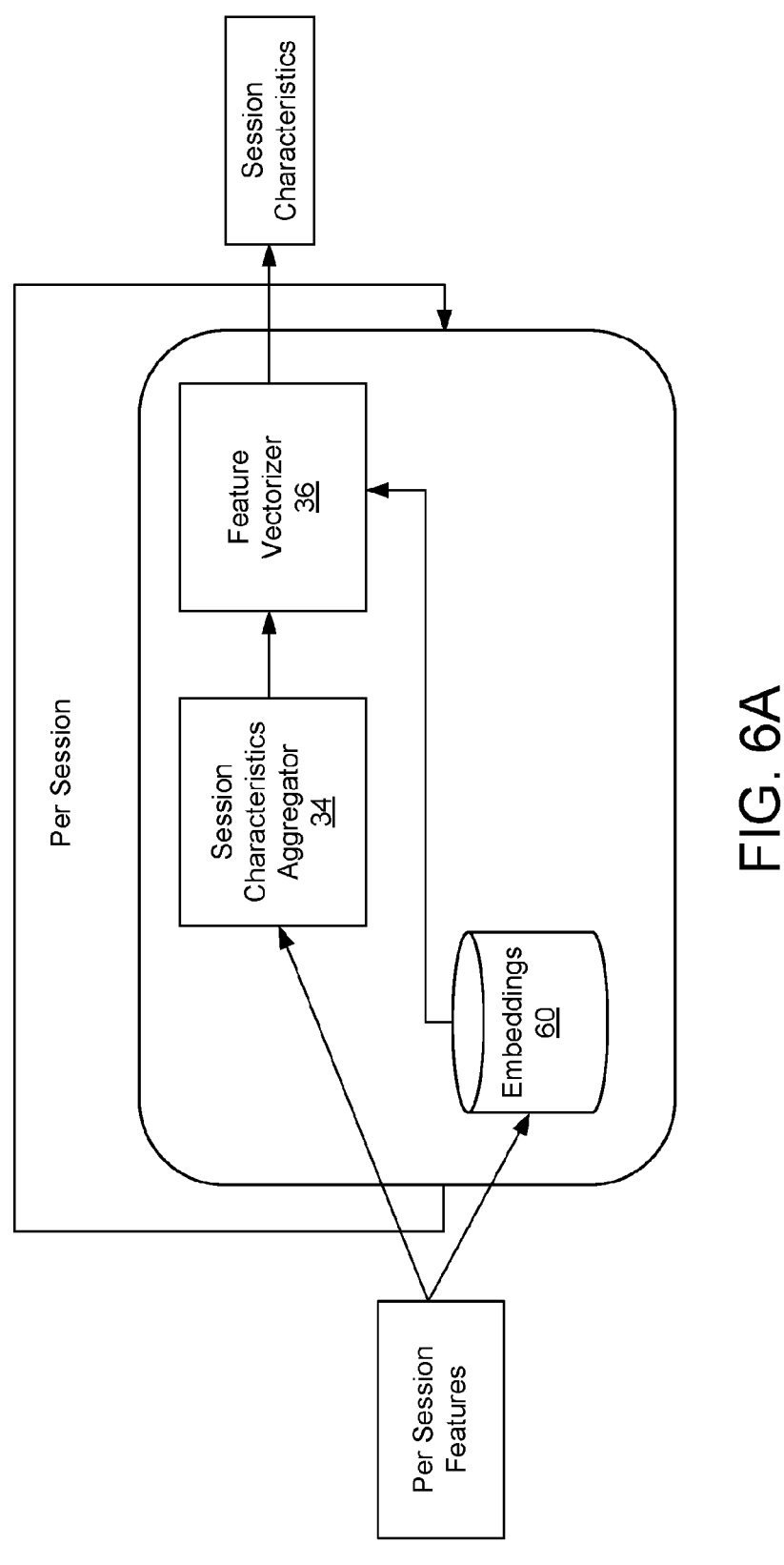
FIGS. 6A-6B are example schematic diagram showing functional modules for aggregation of session characteristics for each session.
Figure 6B:
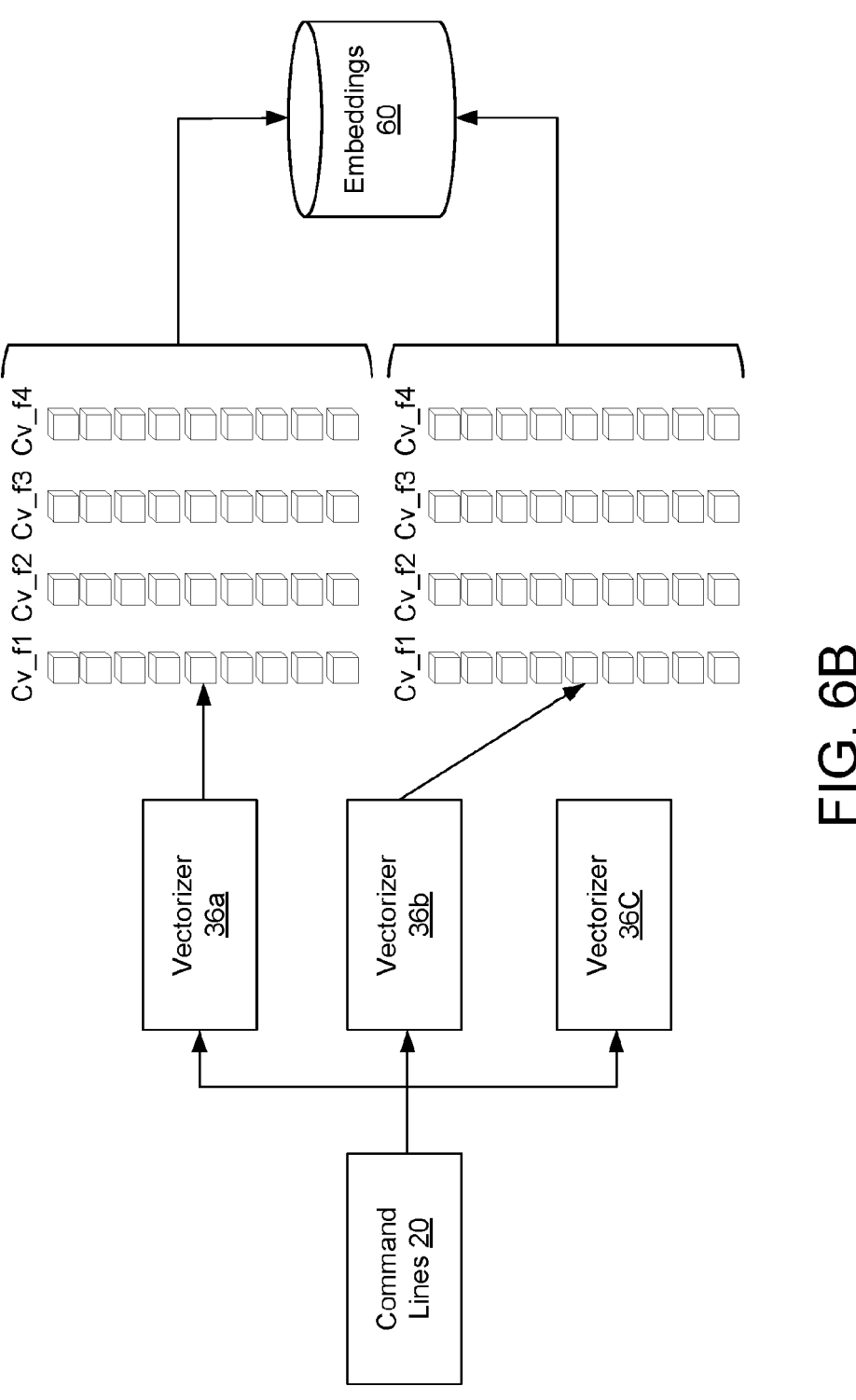

FIGS. 6A-6B are example schematic diagram showing functional modules for aggregation of session characteristics for each session. As depicted in FIG. 6A, the extracted session features for each session i.e., per session features are aggregated for determining the aggregated session characteristics. For example, a session characteristics aggregator 34 may be configured to aggregate per session features for determining the aggregated session characteristics. The session characteristics aggregator 34 may be configured to obtain per session features extracted by the session feature extractor 32 as described in FIG. 4. In addition to the features/characteristics as obtained by the session feature extractor 32, session characteristics aggregator 34 aggregates session data to a closer representation such that the aggregated session characteristics can be applied or subjected to machine learning algorithms for detecting anomalies or outliers.

Thus, the session characteristics aggregation for each session obtains the session characteristics and on a per session basis, the session characteristics are aggregated to create a full representation of the session characteristics. To create the full representation i.e., numerical features and the embedding where there are text features, of the session data, the session characteristics aggregation includes usage of the predefined text features i.e., corpus data and translates the text features from the command lines into feature embeddings 60. The embeddings 60 represent transformed information in new space i.e., numerical representations, which are effective representations for applying machine learning techniques for detection of anomalies.

In an embodiment, a feature vectorizer 36 handles a command line which normally includes a prompt structure followed by a real command. Sometimes, a very long command may be involved. The command can be composed of small or large string and the command lines may contain multiple commands separated by ";" or similar other separators.

In some embodiments, the feature vectorizer 36 may implement suitable mechanisms for determining command line specific separators, and tokenization to create an appropriate vector i.e., feature embedding to differentiate a command line from the other command line.

In other embodiments, the feature vectorizer 36 may implement other techniques like CountVectorizer, TfIdfVectorizer or the like to create feature embeddings.

Thus, the aggregated session characteristics are obtained for each session and on a per session basis the session, the session characteristics are aggregated to create a full representation of the session characteristics.

In an embodiment, the embeddings are created and may be used for terminal session command lines as shown in FIG. 6b.

For example, one type of embedding at a time, i.e., vectorizer 36a such as CommandLineVectorizer or a vectorizer 36b or a vectorizer 36c which creates features associated with the command lines Cv_f1, Cv_f2, . . . Cv_f4 may be used.

In another example, ensemble of techniques may be used to enable create variants of embeddings i.e., cv_f1, cv_f2, . . . and so on+tv_f1, tv_f2, . . . and so on to create complex representations.

It should be noted that the quality of the embeddings is determined by how better the command lines are tokenized and are segregated.

Figure 7:
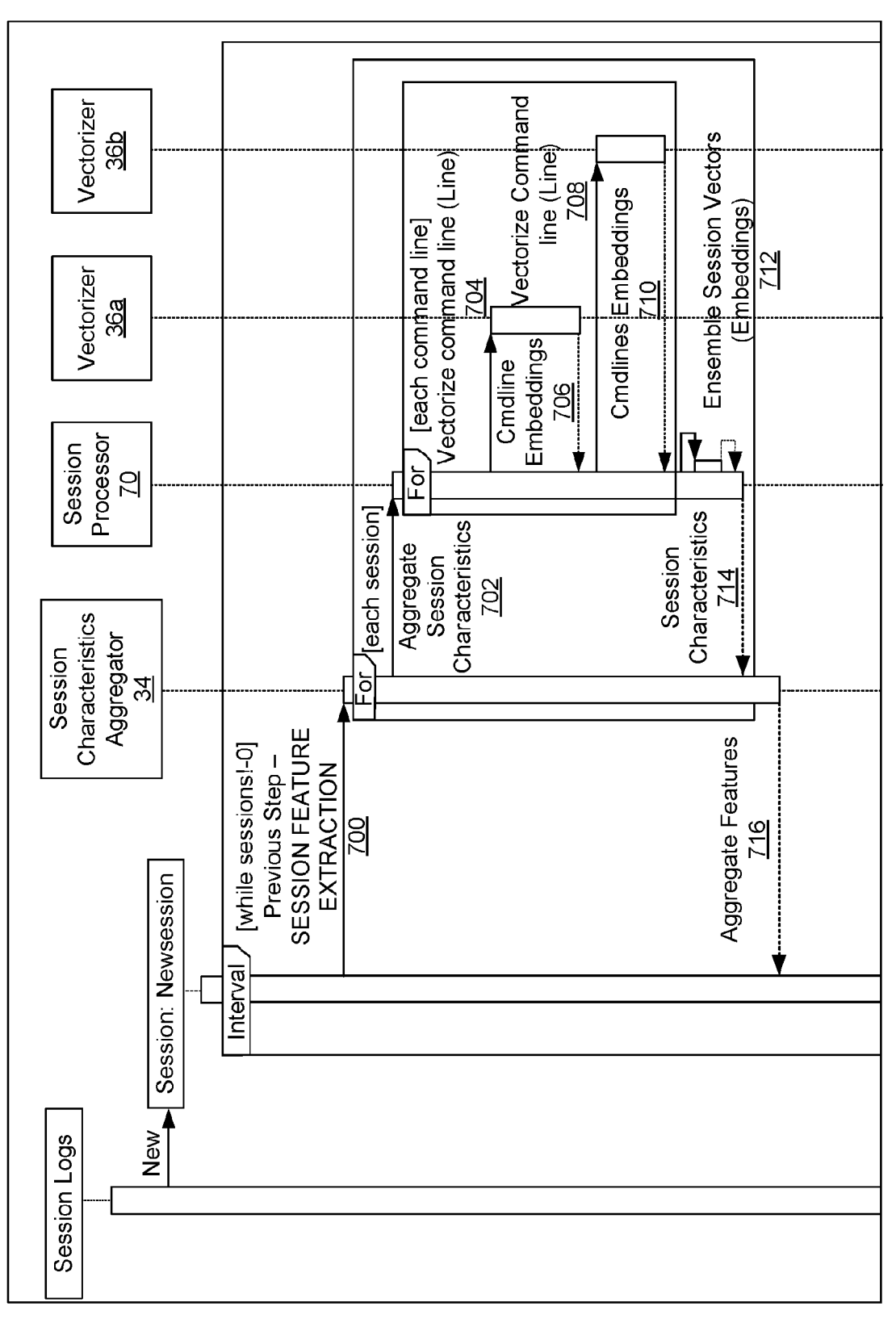
FIG. 7 is an example sequence diagram showing sequence of steps for aggregation of session characteristics for each session.

FIG. 7 is an example sequence diagram showing sequence of steps for aggregation of session characteristics for each session. The sequence diagram in FIG. 7 shows various signalling messages or instructions that are exchanged among the functional modules for aggregation of the session characteristics for each session.

As depicted in FIG. 7, the session logs are obtained as input for aggregation of session characteristics for each session. The session features are extracted 700 for each session as described above. The extracted session features are provided as input to the session characteristics aggregator 34. The session characteristics aggregator 34 transmits 702 the extracted session characteristics for each session for aggregated session characteristics to the session processor 70. Further, the session processor 70 transmits 704 a vectorize command line instruction for each command line to the vectorizer 36a. The vectorizer 36a creates command line embeddings for each command line and transmits 706 the embeddings to the session processor 70.

Further, the session processor 70 transmits 708 a vectorize command line instruction for each command line to the vectorizer 36b. The vectorizer 36b creates command line embeddings for each command line and transmits 710 the embeddings to the session processor 70. The session processor 70 ensembles 712 session vectors of the embeddings received from the vectorizer 30a and 30b respectively and the session processor 70 transmits 714 the aggregated session features to the session characteristics aggregator 34. The session characteristics aggregator 34 transmits 716 the aggregated session features to an output dataset which can be used for anomaly detection.

Figure 8:
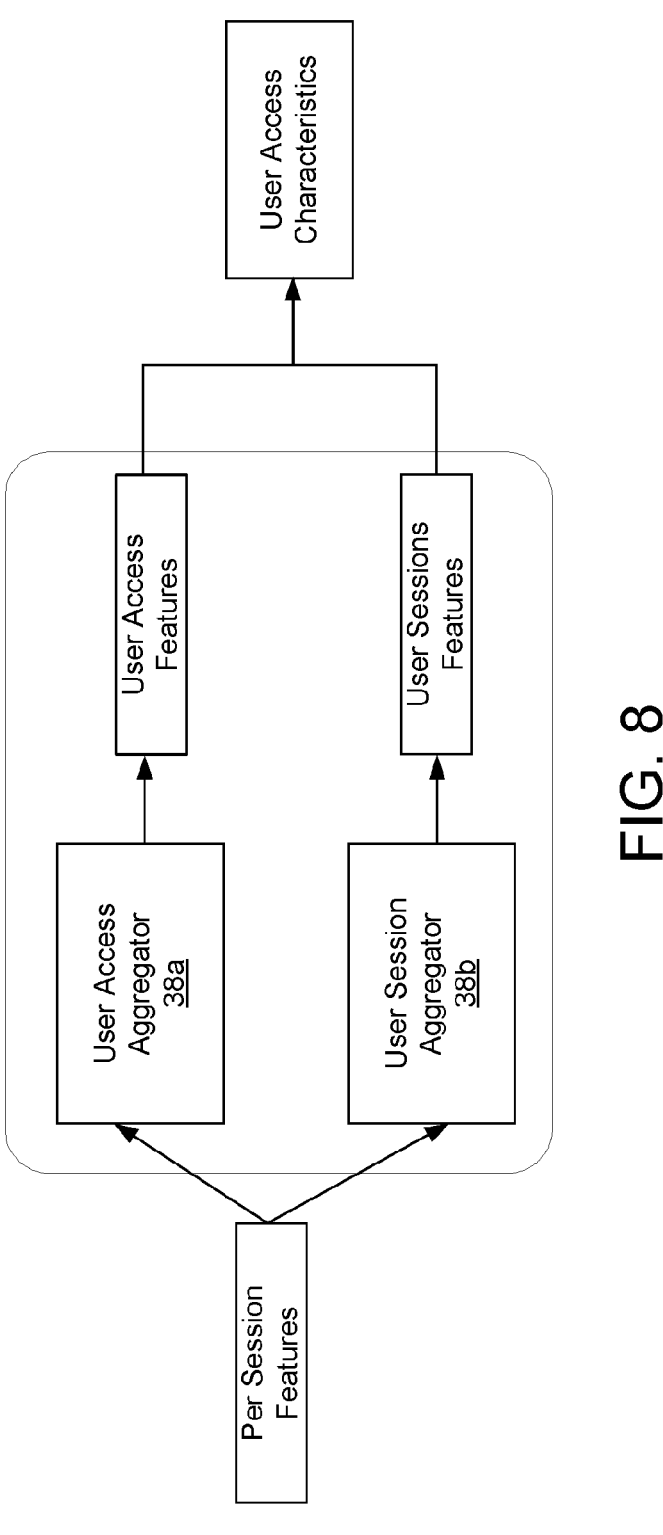
FIG. 8 is an example schematic diagram showing functional modules for aggregation of user access characteristics.

FIG. 8 is an example schematic diagram showing functional modules for aggregation of user access characteristics. The user access characteristics include user access features and user session features. Thus, the user access features and the user session features are aggregated for determining the user access characteristics as shown in FIG. 8.

The user access features are used to identify user behaviours that are different on daily basis and the user sessions features are used to identify user behaviours that are different by execution of commands i.e., change in commands used and change in count of commands used on daily basis. Therefore, the user access features and the user session features contribute to overall user behaviour model and the aggregated version of user access features and the user session features are denoted as user access characteristics which are used to detect a number days the user behaviour was anomalous.

The functional modules involved in aggregation of user access characteristics include a user access aggregator 38a and a user session aggregator 38b. The user access aggregator 38a and the user session aggregator 38b may be configured to obtain the session features for each session or per session extracted features as input for aggregation of the user access characteristics.

In an example, the user access aggregator 38a may be configured to extract one or more properties related to user access of the network nodes 10a-10n. For example, the one or more properties related to the user access of the network nodes 10a-10n may include but not limited to, number of sessions, for example, daily, number of distinct nodes accessed, number of risky commands performed, total duration of all the sessions of the user or the like.

In an example, the user session aggregator 38b may be configured to extract one or more properties related to a session patterns of the user with the network nodes 10a-10n. For example, the user session aggregator 38b may be configured to extract one or more properties such as but not limited to a command used related embeddings i.e., for the sessions for the user, a set of feature embeddings from all the candidate sessions or the like.

The user access features extracted by the user access aggregator 38a and the user session features extracted by the user session aggregator 38b are aggregated to determine the user access characteristics.

Figure 9:
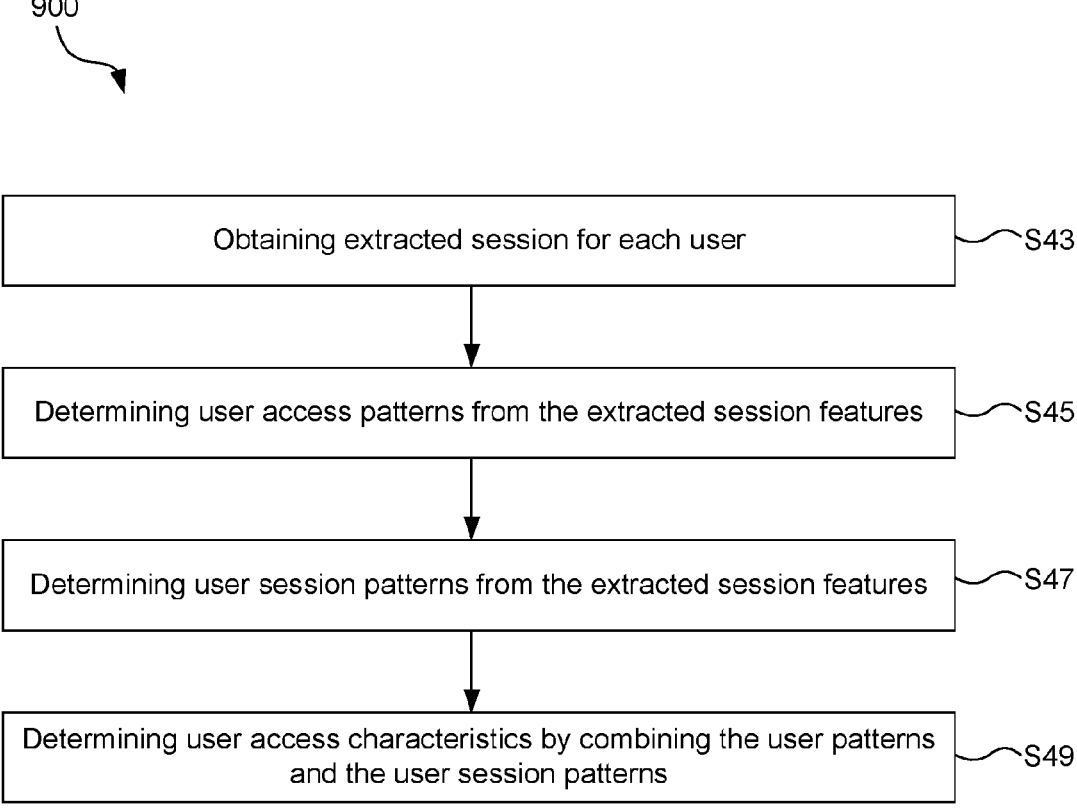
FIG. 9 is a flow chart illustrating various example method steps for aggregation of user access characteristics.

FIG. 9 is a flow chart illustrating an example method 900 for aggregation of user access characteristics. The step S13 as described in FIG. 3, for determining access behaviours comprising a representation indicative of user access characteristics, includes various example steps as described herein. Initially, at step S43, the method 900 includes obtaining the extracted session features for each user. The session features extracted for each user are obtained for determining the aggregation of user access characteristics.

At step S45, the method 900 includes determining user access patterns from the extracted session features. The user access aggregator 38a may be configured to extract one or more properties related to user access of the network nodes 10a-10n. For example, the one or more properties related to the user access of the network nodes 10a-10n may include but not limited to, number of sessions, for example, daily, number of distinct nodes accessed, number of risky commands performed, total duration of all the sessions of the user or the like.

At step S47, the method 900 includes determining user session patterns from the extracted session features. The user session aggregator 38b may be configured to extract one or more properties related to a session patterns of the user with the network nodes 10a-10n. For example, the user session aggregator 38b may be configured to extract one or more properties such as but not limited to a command used related embeddings i.e., for the sessions for the user, a set of feature embeddings from all the candidate sessions or the like.

At step S49, the method 900 includes determining the user access characteristics by combining the user access patterns and the user session patterns. For example, the user access features extracted by the user access aggregator 38a and the user session features extracted by the user session aggregator 38b are aggregated to determine the user access characteristics.

Figure 10:
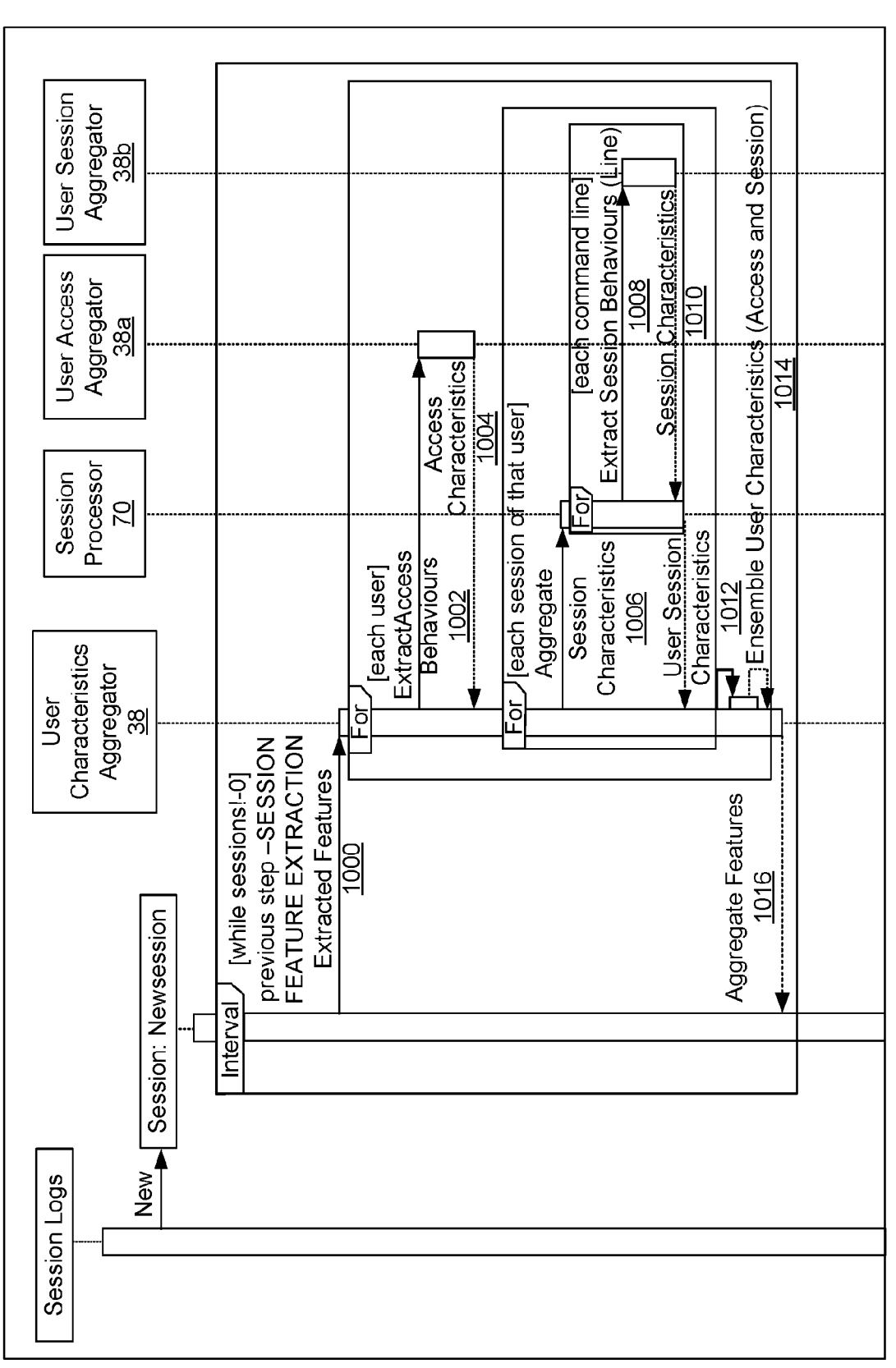
FIG. 10 is an example sequence diagram showing sequence of steps for aggregation of user access characteristics.

FIG. 10 is an example sequence diagram showing sequence of steps for aggregation of user access characteristics. The sequence diagram in FIG. 10 shows various signalling messages or instructions that are exchanged among the functional modules for aggregation of the user access characteristics for each user.

As depicted in FIG. 10, the session logs are obtained as input for aggregation of session characteristics for each session. The session features are extracted 1000 for each session. The extracted session features are provided as input to the session characteristics aggregator 34. The user characteristics aggregator 38 transmits 1002 an extract access behaviours instruction for each user to the user access aggregator 38a. The user access aggregator 38a, upon receiving the extract access behaviours instruction from the session characteristics aggregator 34, determines the user access behaviour and transmits 1004 the determined user access behaviour to the user characteristics aggregator 38.

Further, the user characteristics aggregator 38 transmits 1006 an aggregate session characteristics instruction for each session of the user to the session processor 70. The session processor 70 transmits 1008 an extract session behaviours instruction for each command line to the user session aggregator 38b. The user session aggregator 38b extracts the one or more properties related to the session patterns of the user with the network nodes 10a-10d and transmits 1010 the user session characteristics to the session processor 70. Further, the session process 70 transmits 1012 the user characteristics aggregator 38.

The user access characteristics aggregator 38 ensembles 1014 the user access characteristics which includes the user access characteristics and the user session characteristics and the user access characteristics aggregator 38 transmits 1016 the aggregated user access characteristics to the session logs for storage and retrieval during anomaly detection.

Figure 11:
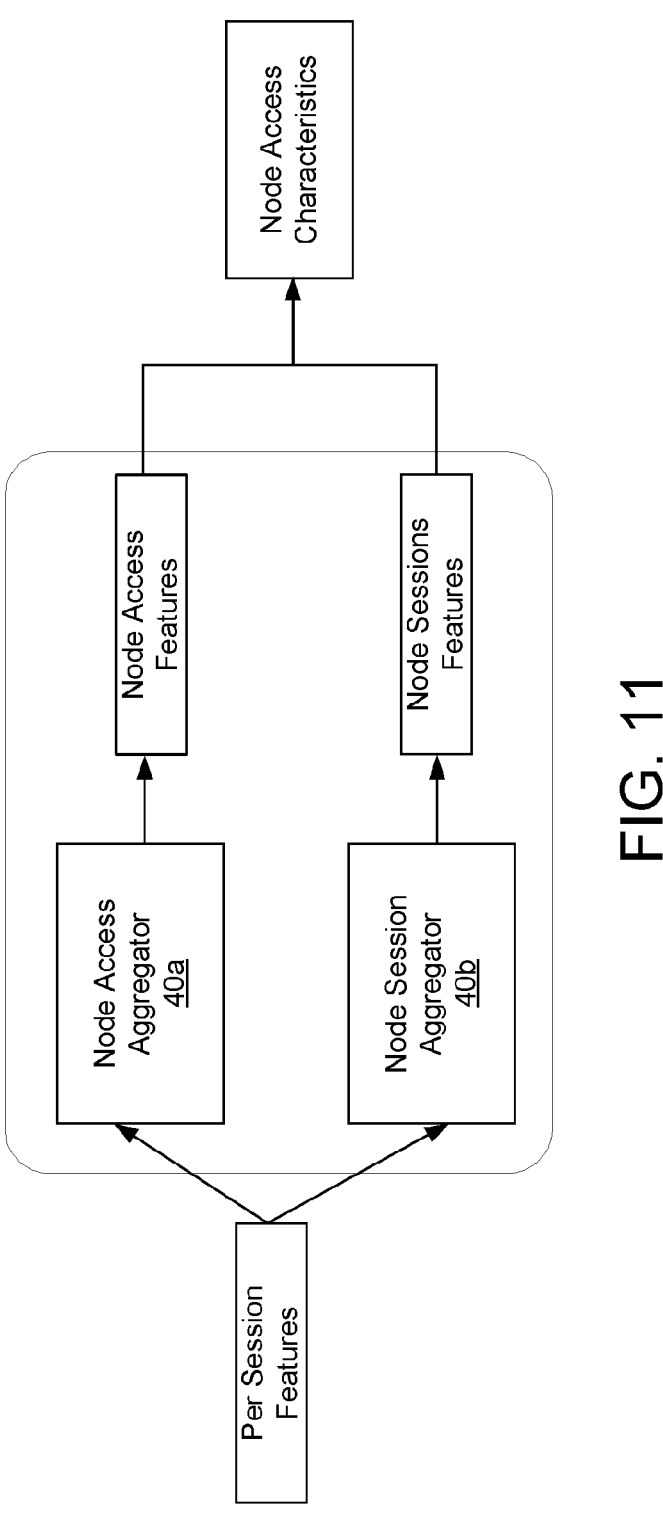
FIG. 11 is an example schematic diagram showing functional modules for aggregation of node access characteristics.

FIG. 11 is an example schematic diagram showing functional modules for aggregation of node access characteristics. The node access characteristics include node access features and node session features. Thus, the node access features and the node session features are aggregated for determining the node access characteristics as shown in FIG. 11.

The node access features may include but not limited to a number of sessions, for example, daily, number of distinct users accessed, number of risky commands performed, total duration of all the sessions, or the like. The node session features may include but not limited to command used related to embeddings, i.e., for the sessions in that node, a set of feature embeddings from all the candidate sessions, or the like.

Thus, the node access features may be extracted by determining the following properties namely, number of sessions, number of distinct users accessed, number of risky commands performed, total duration of all the sessions or the like. Similarly, the node session features may be extracted by determining the command used related to embeddings, i.e., for the sessions in that node, a set of feature embeddings from all the candidate sessions, or the like.

The node access features are used to identify user behaviours that are different on a particular node on a daily basis and the node session features are used to identify user behaviours that are different on a particular node by execution of commands i.e., change in commands used and change in count of commands used.

Therefore, the node access features and the node session features contribute to overall user behaviour model and the aggregated version of node access features and the node session features are denoted as node access characteristics.

The functional modules involved in aggregation of node access characteristics include a node access aggregator 40a and a node session aggregator 40b. The node access aggregator 40a and the node session aggregator 40b may be configured to obtain the session features for each session or per session extracted features as input for aggregation of the node access characteristics.

In an example, the node access aggregator 40a is configured to extract one or more properties related to a node access among the network nodes 10a-10n. For example, the one or more properties related to the node access among the network nodes 10a-10n may include but not limited to number of sessions, number of distinct users accessed, number of risky commands performed, total duration of all the sessions or the like.

In an example, the node session aggregator 40b is configured to extract one or more properties related to sessions of the nodes. For example, the one or more properties related to the node access among the network nodes 10a-10n may include but not limited to the command used related to embeddings, i.e., for the sessions in that node, a set of feature embeddings from all the candidate sessions, or the like.

The node access features extracted by the node access aggregator 40a and the node session features extracted by the node session aggregator 40b are combined to determine the node access characteristics.

FIG. 12 is a flow chart illustrating an example method 1200 for aggregation of node access characteristics. The step S13 as described in FIG. 3, for determining access behaviours comprising a representation indicative of node access characteristics, includes various example steps as described herein. Initially, at step S63, the method 1200 includes obtaining the extracted session features for each node. The session features extracted for each node are obtained for determining the aggregation of node access characteristics.

At step S65, the method 1200 includes determining node access patterns from the extracted session features. The node access aggregator 40a may be configured to extract one or more properties related to node access among the network nodes 10a-10n. For example, the node access aggregator 40a may be configured to extract the one or more properties including but not limited to number of sessions, for example, daily, number of distinct users accessed, number of risky commands performed, total duration of all the sessions or the like.

At step S67, the method 1200 includes determining node session patterns from the extracted session features. The node session aggregator 40b may be configured to extract one or more properties related a session of a node among the network nodes 10a-10n. The node session features may include but not limited to the command used related to embeddings, i.e., for the sessions in that node, a set of feature embeddings from all the candidate sessions, or the like.

At step S69, the method 1200 includes determining the node access characteristics by combining the node access patterns and the node session patterns. For example, the node access patterns/features extracted by the user access aggregator 40a and the node session features extracted by the node session aggregator 40b are aggregated to determine the node access characteristics.

Figure 13:
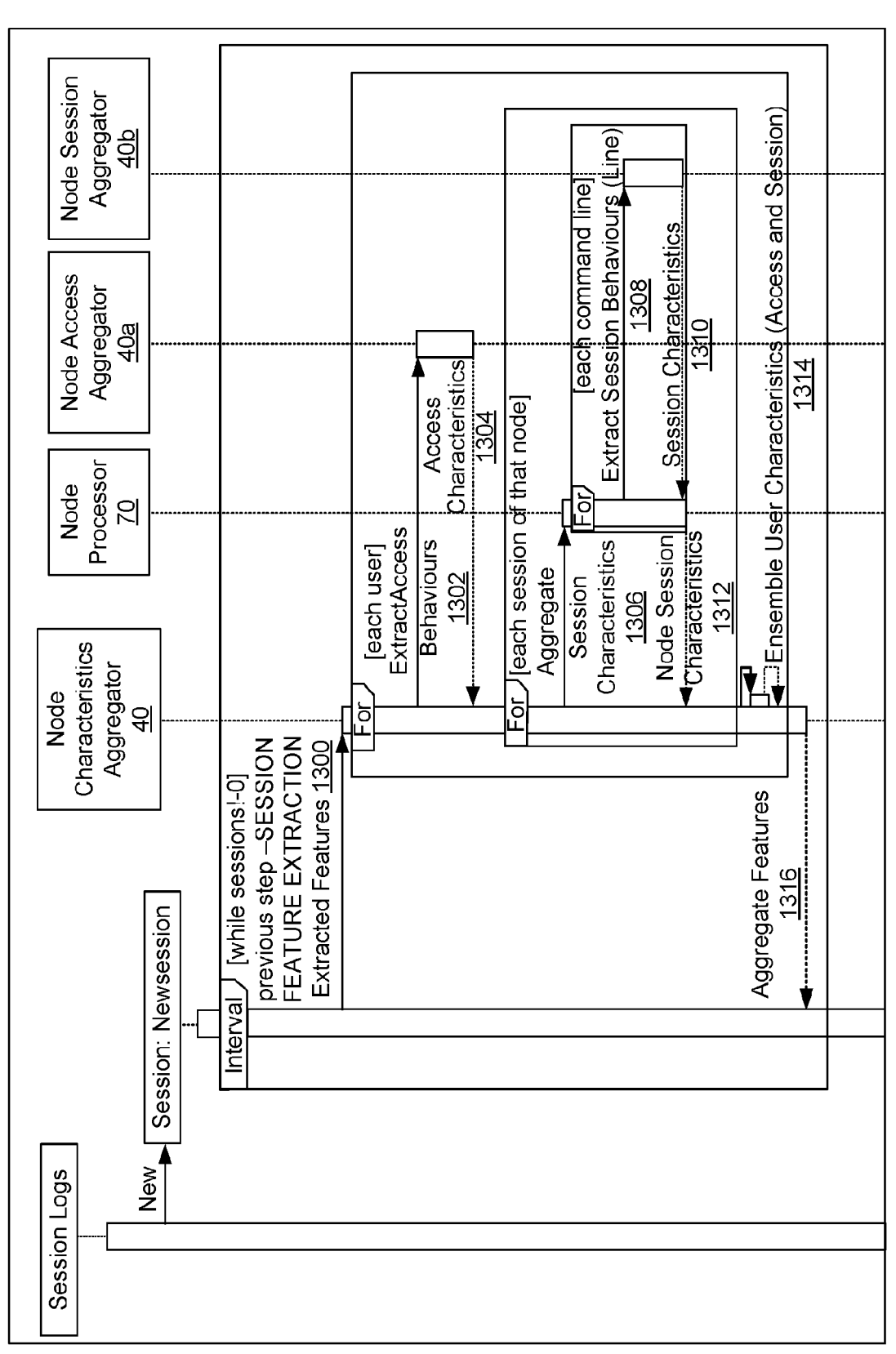
FIG. 13 is an example sequence diagram showing sequence of steps for aggregation of node access characteristics.

FIG. 13 is an example sequence diagram showing sequence of steps for aggregation of node access characteristics.

The sequence diagram in FIG. 13 shows various signalling messages or instructions that are exchanged among the functional modules for aggregation of the node access characteristics for each node.

As depicted in FIG. 13, the session logs are obtained as input for aggregation of session characteristics for each session. The session features are extracted 1300 for each session. The extracted session features are provided as input to the node characteristics aggregator 40. The node characteristics aggregator 40 transmits 1302 an extract access behaviours instruction for each node to the node access aggregator 40a. The node access aggregator 40a, upon receiving the extract access behaviours instruction from the node characteristics aggregator 40, determines the node access features and transmits 1304 the determined node access features to the node characteristics aggregator 40.

Further, the node characteristics aggregator 40 transmits 1306 an aggregate session characteristics instruction for each session of the node to the session processor 70. The session processor 70 transmits 1308 an extract session behaviours instruction for each command line to the node session aggregator 40b. The node session aggregator 40b extracts the one or more properties related to the node session patterns among the network nodes 10a-10d and transmits 1310 the node session patterns to the session processor 70. Further, the session process 70 transmits 1312 the node characteristics aggregator 40.

The node access characteristics aggregator 40 ensembles 1314 the node access characteristics which includes the node access patterns/characteristics and the node session patterns/characteristics and the node characteristics aggregator 40 transmits 1316 the aggregated node access characteristics to the session logs for storage and retrieval during anomaly detection.

Figure 14:
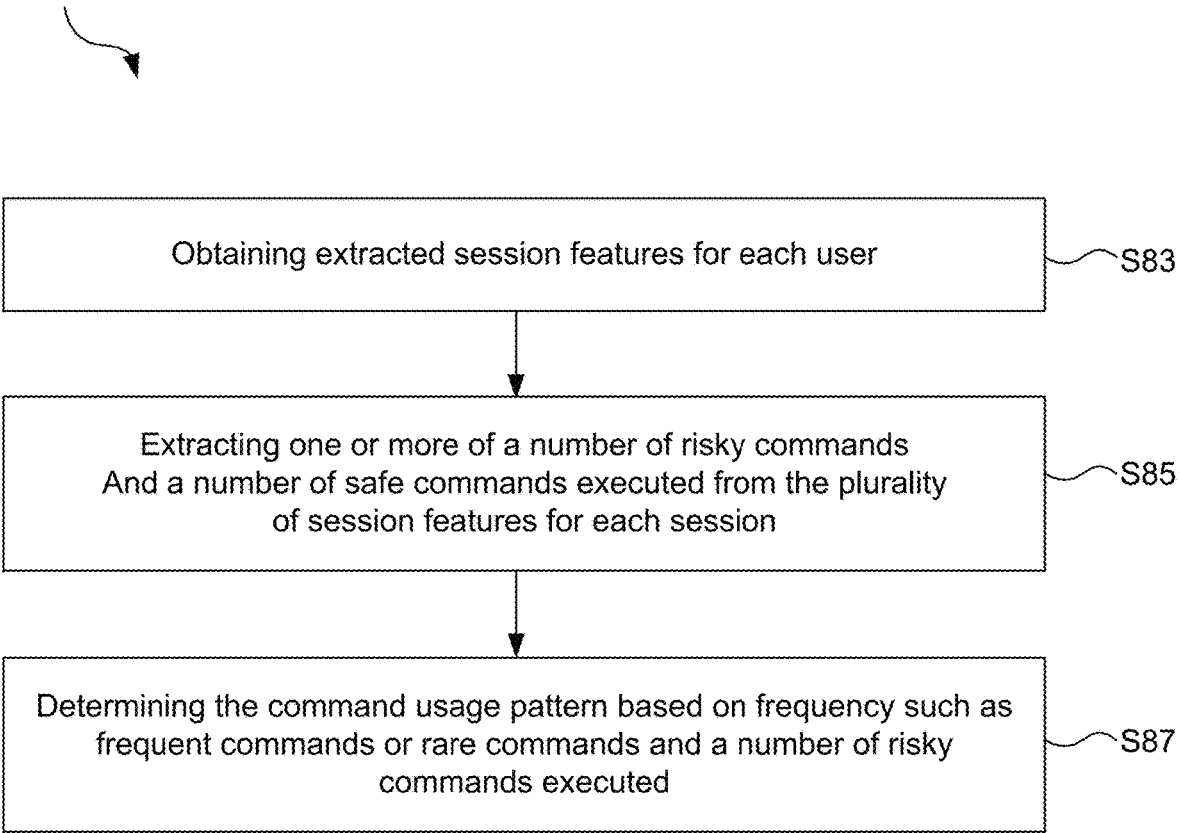
FIG. 14 is a flowchart illustrating example method steps for determining command usage characteristics.

FIG. 14 is a flowchart illustrating an example method 1400 for determining command usage characteristics. The step S13 as described in FIG. 3, for determining access behaviours comprising a representation indicative of command usage characteristics, includes various example steps as described herein. The command usage characteristics involves identifying frequent, rare commands used in a session. The determination of command usage characteristics involves extraction of risky or safe commands which can be monitored to help expose the command usage characteristics. For example, the determination of command usage characteristics include counting of repeated command usage behaviours at a command level. Thus, the determination of command usage characteristics enables an explorative view of behaviours across the overall sessions providing additional insights for the operations to improve its efficiency or identify features that will make administration easy based on the findings. The extracted command usage characteristics can be visually represented for easy exploration by the network operator using a GUI.

The various steps involved in determining the command usage characteristics are described in the method 1400. Initially, at step S83, the method 1400 includes obtaining the extracted session features for each user. The session features extracted for each user are obtained for determining the command usage characteristics.

At step S85, the method 1400 includes extracting one or more of a number of risky commands and a number of safe commands executed from the plurality of session features for each session. For example, the session features are evaluated to extract or identify the number of risky commands and a number of safe commands executed by the user.

At step S87, the method 1400 includes determining the command usage pattern based on frequency such as frequent commands or rare commands and a number of risky commands executed.

In an example, the session feature extractor 32 may be configured to extract the number of risky commands and the number of safe commands executed for each session based on a pre-defined risky commands 15 and a pre-defined safe commands 16 which are fed as input to the session feature extractor 32, through the augmenting engine 18.

For example, the command usage pattern may be determined by extracting the number of risky commands and a number of safe commands executed for each session. In a particular session, if the user is executing a risky command, for example, a risky command is executed for five times, then the repeated risky command execution is indicative of anomalous user behaviour. Thus, the command usage pattern of the user may be determined by the number of risky command executions.

In an example, the command usage pattern may rely on bucketing commands based on frequency of execution of commands and exposing explorative views to the network administrators. The command anomalies may be determined by checking risky commands and their frequency of execution. For example, if a certain risky command is executed approximately 10 times in the last 10 days, and the current day has a spike 100 risky commands, then this indicates a command level anomaly.

Therefore, command usage characteristics involves identifying frequent, rare commands which are extracted to determine the risky/safe commands used and are monitored over a period to the command usage characteristics.

FIG. 15 is a flowchart illustrating an example method 1500 for detecting anomalous access behaviours based on determined access behaviours. The access behaviours are for example determined as described in relation to FIGS. 5A-5C, FIG. 9, FIG. 12 and FIG. 14. The various steps involved in determining the command usage characteristics are described in the method 1500. Initially, at step S51, the method 1500 includes obtaining the representation of the session characteristics, the user access characteristics, the network node access characteristics and the command usage characteristics. For example, the representation involving the session characteristics, the user access characteristics, the network node access characteristics and the command usage characteristics. Each of the representation involving the session characteristics, the user access characteristics, the network node access characteristics and the command usage characteristics are different in their format or structure and respectively each of the representation involving the session characteristics, the user access characteristics, the network node access characteristics and the command usage characteristics need appropriate technique/algorithm to detect outliers/anomalies.

At step S53, the method 1500 includes detecting anomalous sessions by applying anomaly detection on the obtained session characteristics. For example, the session characteristics include a set of numerical, categorical and embeddings related features. Therefore, a tree inspired anomaly algorithm may be used to detect anomalies. For example, Isolation Forest technique may applied to detect anomalous sessions on the obtained session characteristics.

At step S55, the method 1500 includes detecting anomalous users by applying anomaly detection on the obtained user access characteristics. The user access characteristics involves a set of numerical properties per user for the user access features. Thus, the anomaly detection on user access features may be performed using algorithms like z-score to find deviated behaviour against configured historical period and to report anomalies. Further, the user session features involves a set of categorical properties per user and the anomaly detection on user session features may be performed using algorithms like Isolation Forest.

At step S57, the method 1500 includes detecting anomalous network nodes by applying anomaly detection on the obtained node access characteristics. The node access characteristics involves a set of numerical properties per user for the node access features. Thus, the anomaly detection on node access features may be performed using algorithms like z-score to find deviated behaviour against configured historical period and to report anomalies. Further, the node session features involves a set of categorical properties per node and the anomaly detection on node session features may be performed using algorithms like Isolation Forest.

At step S59, the method 1500 includes detecting anomalous commands from the command usage characteristics by analysing the number of risky commands and the number of safe commands executed for each session. For example, the detecting anomalous commands from the command usage characteristics involves evaluating the set of commands as used by the different users in different sessions and summarizing the most frequent, most rare and counts on risky, safe commands as configured accordingly. Thus, the anomaly detection from the command usage characteristics provides an explorative view of user behaviour.

FIG. 16 is an example schematic diagram showing functional modules of the network node 10 of FIG. 1A. The network node 10 includes various functional modules which perform various steps for detecting the anomalous access behaviours in the plurality of network nodes 10*a*-10*n* in the communication network 100 of FIG. 1A. For example, the session analytics function 30 of the network node 10 implements various functional modules that are configured to perform the various steps for detecting the anomalous access behaviours in the plurality of network nodes 10*a*-10*n* in the communication network 100.

The various functional modules of the session analytics function 30 include an obtainer 81, a feature extractor 82, a communicator 83, an evaluator 84, a tokenizer 85, an aggregator 86 and an anomaly detector 87.

In an example, the obtainer 81 may be configured to obtain the session logs 11 associated with the plurality of network nodes 10*a*-10*n* of the communication network 100.

The feature extractor 82 may be configured to extract session features for each session. For example, the session feature extractor 82 may be configured to extract various features of a session including number of lines in a session, command line features, over the lines inferred as command lines, for example, number of command lines, strings or readable command lines representation properties from session data viz., session user, session start time, session end time, node id, or the like.

The communicator 83 may be configured to communicate with one or more network nodes 10*a*-10*n* in the communication network 100 using suitable communication protocols.

The evaluator 84 may be configured to evaluate and/or determine the access behaviours associated with each session based on the extracted session features. The access behaviours associated with each session includes a representation indicative of one or more of session characteristics, user access characteristics, network node access characteristics and command usage characteristics.

In an example, the tokenizer 85 may be configured to handle a command line which normally includes a prompt structure followed by a real command. Sometimes, a very long command may be involved. The command can be composed of small or large string and the command lines may contain multiple commands separated by ";" or similar other separators.

In some examples, the feature vectorizer 36 may implement suitable mechanisms for determining command line specific separators, and tokenization to create an appropriate vector feature embedding to differentiate one command line from the other command line.

In other examples, the feature vectorizer 36 may implement other techniques like Count Vectorizer, TfIdf Vectorizer or the like to create embeddings.

In an example, the aggregator 86 may be configured to aggregate the session characteristics per session or for each session, user access characteristics which include the user access features and the user session features, node access characteristics which include the node access features and the node session features and the command usage patterns of the user. For example, the aggregator 86 may be implemented as session characteristics aggregator 34, user access characteristics aggregator 38 and the node access characteristics aggregator 40 respectively for aggregating the session characteristics per session or for each session, the user access characteristics and the node access characteristics.

In an example, the anomaly detector 87 may be configured to perform anomaly detection on the access behaviours associated with each session which includes a representation indicative of the session characteristics, the user access characteristics, the network node access characteristics and the command usage characteristics. For example, the anomaly detector 87 may implement various techniques such as Isolation Forest may applied to detect anomalous sessions on the obtained session characteristics. The anomaly detector 87 may implement algorithms like z-score on the user access characteristics and node access characteristics to detect anomalous user behaviours and the anomalous nodes. Further, the anomaly detector 87 may detect the anomalous commands from the command usage characteristics by evaluating the set of commands as used by the different users in different sessions and summarizing the most frequent, most rare and counts on risky, safe commands as configured accordingly.

Figure 17:
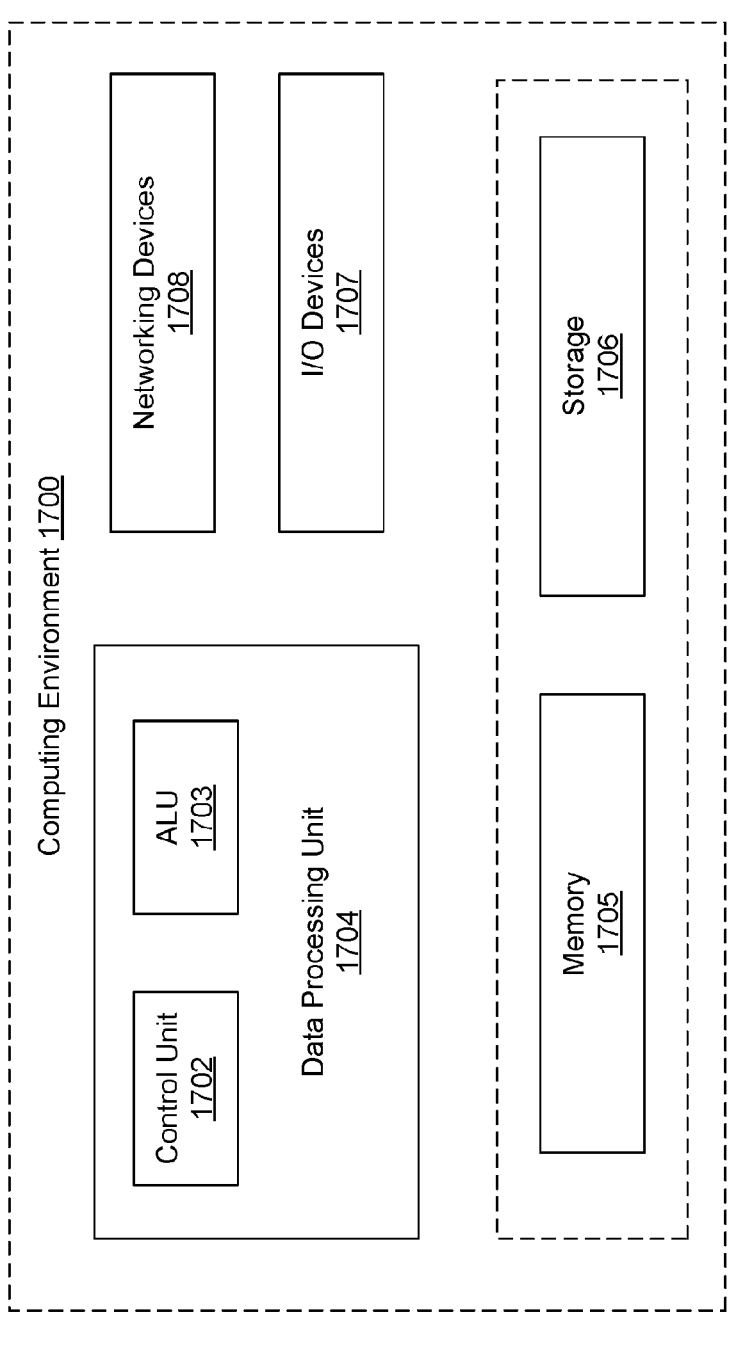
FIG. 17 discloses an example computing environment.

FIG. 17 illustrates an example computing environment 1700 implementing a method and the network node 10 for detecting anomalous access behaviours described in FIG. 3. As depicted in FIG. 17, the computing environment 1700 comprises at least one data processing unit 1704 that is equipped with a control unit 1702 and an Arithmetic Logic Unit, ALU 1703, a memory 1705, a storage 1706, plurality of networking devices 1708 and a plurality Input output, I/O devices 1707. The data processing unit 1704 is responsible for processing the instructions of the algorithm. For example, the data processing unit 1704 is equivalent to the processing circuitry of the network node 10. The data processing unit 1704 is capable of executing software instructions stored in memory 1705. The data processing unit 1704 receives commands from the control unit 1702 in order to perform its processing. Further, any logical and arithmetic operations involved in the execution of the instructions are computed with the help of the ALU 1703.

The data processing unit 1704 causes the network node obtaining the session logs associated with the plurality of network nodes in the communication network. Further, the data processing unit 1704 causes the extraction of session features for each session by evaluating the session logs associated with the plurality of network nodes. The data processing unit 1704 causes the determination of the access behaviours associated with each session based on the extracted session features. Further, the data processing unit 1704 causes the detection of anomalous access behaviours by analysing the determined access behaviours.

The overall computing environment 1700 can be composed of multiple homogeneous and/or heterogeneous cores, multiple CPUs of different kinds, special media and other accelerators. The data processing unit 1704 is responsible for processing the instructions of the algorithm. Further, the plurality of data processing units 1704 may be located on a single chip or over multiple chips.

The algorithm comprising of instructions and codes required for the implementation are stored in either the memory 1705 or the storage 1706 or both. At the time of execution, the instructions may be fetched from the corresponding memory 1705 and/or storage 1706, and executed by the data processing unit 1704.

In case of any hardware implementations various networking devices 1708 or external I/O devices 1707 may be connected to the computing environment to support the implementation through the networking devices 1708 and the I/O devices 1707.

The embodiments disclosed herein can be implemented through at least one software program running on at least one hardware device and performing network management functions to control the elements. The elements shown in FIG. 17 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method for detecting anomalous access behaviours in a plurality of network nodes in a communication network, the method being performed in at least one network node in the communication network, wherein the method comprises:
   obtaining session logs associated with the plurality of network nodes in the communication network;
   extracting session features for each session by evaluating the session logs associated with the plurality of network nodes, wherein extracting session features comprises:
      obtaining input data sets, the input data sets comprising a set of command lines, a set of non-command lines, and a set of pre-defined commands indicative of a command type, a command category, safe commands, and risky commands; and
      evaluating a set of command lines in the session logs using the obtained input data sets and the set of pre-defined commands;
   determining access behaviours associated with each session based on the extracted session features, wherein the access behaviours associated with each session comprising a representation indicative of one or more of session characteristics, user access characteristics, network node access characteristics and command usage characteristics; and
   detecting the anomalous access behaviours by analysing the determined access behaviours.

2. The method according to claim 1, wherein evaluating the set of command lines in each of the session logs based on the obtained input data sets and the set of pre-defined commands comprises:
   determining a set of command lines in each of the session logs based on the obtained input data sets comprising the set of command lines, the set of non-command lines and the set of pre-defined commands; and
   extracting features associated with the determined set of command lines in each of the session logs.

3. The method according to claim 2, wherein determining the set of command lines in each of the session logs comprises:
   extracting multiple lines from each of the session logs;
   converting one or more special characters and spaces identified in each line of the session logs to an equivalent vector of strings; and
   determining the set of command lines in each of the session logs using a model trained with the obtained input data sets.

4. The method according to claim 1, wherein determining the access behaviours comprising the representation indicative of the session characteristics associated with each session comprises:
   obtaining the extracted session features for each session;
   identifying textual features in a set of command lines from the session features for each session;
   translating the identified textual features in the set of command lines to an equivalent vector using a vectorizer; and
   creating a numerical representation for the set of command lines for each session, wherein the numerical representation is created by applying a feature vector for each command line in the set of command lines and the translated textual features.

5. The method according to claim 1, wherein determining the access behaviours comprising the representation indicative of the user access characteristics associated with each session based on the extracted plurality of session features comprises:
   obtaining the extracted session features for each user;
   determining user access patterns for each session of the user from the extracted session features based on one or more of a number of sessions for each user, a number of network nodes accessed for each user, a number of risky commands executed by each user, and a duration of the sessions for each user;
   determining user session patterns for each session of the user from the extracted session features based on one or more of command lines for each session and command category for each session; and determining the user access characteristics by combining the determined user access patterns and determined user session patterns.

6. The method according to claim 1, wherein determining the access behaviours comprising the representation indicative of the network node access characteristics associated with each session based on the extracted plurality of session features comprises:

obtaining the extracted session features for each node;

determining node access patterns for each session of the node from the session features based on one or more of a number of sessions for each node, a number of users accessed for each node, a number of risky commands executed for each node, and a duration of the sessions for each node;

determining node session patterns for each session of the node from the session features based on one or more of command lines for each session and command category for each session; and determining the node access characteristics by combining the determined node access patterns and determined node session patterns.

7. The method according to claim 1, wherein determining the access behaviours comprising the representation indicative of the command usage characteristics associated with each session based on the extracted plurality of session features comprises:

obtaining the extracted session features for each session;

extracting one or more of a number of risky commands and a number of safe commands executed from the plurality of session features for each session; and determining the command usage pattern based on frequency such as frequent commands or rare commands and the number of risky commands executed.

8. The method according to claim 1, wherein detecting anomalous access behaviours by analysing the determined access behaviours comprises:

obtaining the representation indicative of one or more of the session characteristics, the user access characteristics, the network node access characteristics and the command usage characteristics;

detecting the anomalous sessions by applying anomaly detection on the obtained session characteristics;

detecting the anomalous users by applying anomaly detection on the obtained user access characteristics;

detecting the anomalous network nodes by applying anomaly detection on the obtained network node access characteristics; and detecting the anomalous commands from the obtained command usage characteristics by analysing the number of risky commands and the number of safe commands executed for each session.

9. The method according to claim 1, further comprising:

causing to display the detected anomalous access behaviours being indicative of one or more of anomalous sessions, anomalous users, anomalous network nodes and anomalous commands.

10. A network node for detecting anomalous access behaviours in a plurality of network nodes in a communication network, the network node comprising a data processing unit;

and a memory storing instructions that, when executed by the data processing unit, cause the network node to:

obtain session logs associated with the plurality of network nodes in the communication network;

extract a plurality of session features for each session by evaluating the session logs associated with the plurality of network nodes, wherein extracting session features comprises:

obtaining input data sets, the input data sets comprising a set of command lines, a set of non-command lines, and a set of pre-defined commands indicative of a command type, a command category, safe commands, and risky commands; and evaluating a set of command lines in the session logs using the obtained input data sets and the set of pre-defined commands;

determine access behaviours associated with each session based on the extracted plurality of session features, wherein the access behaviours associated with each session comprises a representation indicative of one or more of session characteristics, user access characteristics, network node access characteristics and command usage characteristics; and detect the anomalous access behaviours by analysing the determined access behaviours.

11. The network node according to claim 10, wherein the network node is in communication with the plurality network nodes in the communication network and is configured for accessing the session logs associated with the plurality network nodes for a pre-configured time interval for detecting anomalous access behaviours in the communication network.

12. The network node according to claim 10, wherein the network node is configured to determine the access behaviours comprising the representation indicative of the session characteristics associated with each session by:

obtaining the extracted session features for each session;

identifying textual features in a set of command lines from the session features for each session;

translating the identified textual features in the set of command lines to an equivalent vector using a vectorizer; and creating a numerical representation for the set of command lines for each session, wherein the numerical representation is created by applying a feature vector for each command line in the set of command lines and the translated textual features.

13. The network node according to claim 10, wherein the network node is configured to determine the access behaviours comprising the representation indicative of the user access characteristics associated with each session based on the extracted plurality of session features by:

obtaining the extracted session features for each user;

determining user access patterns for each session of the user from the extracted session features based on one or more of a number of sessions for each user, a number of network nodes accessed for each user, a number of risky commands executed by each user, and a duration of the sessions for each user;

determining user session patterns for each session of the user from the extracted session features based on one or more of command lines for each session and command category for each session; and determining the user access characteristics by combining the determined user access patterns and determined user session patterns.

14. The network node according to claim 10, wherein the network node is configured to determine the access behaviours comprising the representation indicative of the network node access characteristics associated with each session based on the extracted plurality of session features by:

obtaining the extracted session features for each node;

determining node access patterns for each session of the node from the session features based on one or more of a number of sessions for each node, a number of users accessed for each node, a number of risky commands executed for each node, and a duration of the sessions for each node;

determining node session patterns for each session of the node from the session features based on one or more of command lines for each session and command category for each session; and determining the node access characteristics by combining the determined node access patterns and determined node session patterns.

15. The network node according to claim 10, wherein the network node is configured to determine the access behaviours comprising the representation indicative of the command usage characteristics associated with each session based on the extracted plurality of session features by:

obtaining the extracted session features for each session;

extracting one or more of a number of risky commands and a number of safe commands executed from the plurality of session features for each session; and determining the command usage pattern based on the extracted one or more of the number of risky commands and the number of safe commands executed for each session.

16. The network node according to claim 10, wherein the network node is configured to detecting anomalous access behaviours by analysing the determined access behaviours by:

obtaining the representation indicative of one or more of the session characteristics, the user access characteristics, the network node access characteristics and the command usage characteristics;

detecting the anomalous sessions by applying anomaly detection on the obtained session characteristics;

detecting the anomalous users by applying anomaly detection on the obtained user access characteristics;

detecting the anomalous network nodes by applying anomaly detection on the obtained network node access characteristics; and detecting the anomalous commands from the obtained command usage characteristics by analysing the number of risky commands and the number of safe commands executed for each session.

17. A computer program product comprising a non-transitory computer readable medium, having thereon a computer program comprising program instructions, the computer program being loadable into a data processing unit and configured to cause execution of the following method when the computer program is run by the data processing unit:

obtaining session logs associated with the plurality of network nodes in the communication network;

extracting session features for each session by evaluating the session logs associated with the plurality of network nodes, wherein extracting session features comprises:

obtaining input data sets, the input data sets comprising a set of command lines, a set of non-command lines, and a set of pre-defined commands indicative of a command type, a command category, safe commands, and risky commands; and evaluating a set of command lines in the session logs using the obtained input data sets and the set of pre-defined commands;

determining access behaviours associated with each session based on the extracted session features, wherein the access behaviours associated with each session comprising a representation indicative of one or more of session characteristics, user access characteristics, network node access characteristics and command usage characteristics; and detecting the anomalous access behaviours by analysing the determined access behaviours.

* * * * *